United States Patent
Argones Rua et al.

(10) Patent No.: US 11,171,785 B2
(45) Date of Patent: Nov. 9, 2021

(54) AUTHENTICATION METHOD AND SYSTEM

(71) Applicant: KATHOLIEKE UNIVERSITEIT LEUVEN, Leuven (BE)

(72) Inventors: Enrique Argones Rua, Leuven (BE); Aysajan Abidin, Leuven (BE)

(73) Assignee: KATHOLIEKE UNIVERSITEIT LEUVEN, Leuven (BE)

(*) Notice: Subject to any disclaimer, the term of this patent is extended or adjusted under 35 U.S.C. 154(b) by 388 days.

(21) Appl. No.: 16/344,207

(22) PCT Filed: Oct. 26, 2017

(86) PCT No.: PCT/EP2017/077418
§ 371 (c)(1),
(2) Date: Apr. 23, 2019

(87) PCT Pub. No.: WO2018/078003
PCT Pub. Date: May 3, 2018

(65) Prior Publication Data
US 2020/0076604 A1 Mar. 5, 2020

(30) Foreign Application Priority Data

Oct. 31, 2016 (GB) ..................... 1618360
Nov. 3, 2016 (GB) ..................... 1618556

(51) Int. Cl.
*H04L 9/32* (2006.01)
*H04L 9/08* (2006.01)
*H04L 9/30* (2006.01)

(52) U.S. Cl.
CPC .......... *H04L 9/3231* (2013.01); *H04L 9/0869* (2013.01); *H04L 9/30* (2013.01); *H04L 9/3234* (2013.01); *H04L 9/3278* (2013.01)

(58) Field of Classification Search
CPC ....... H04L 9/3231; H04L 9/0869; H04L 9/30; H04L 9/3234; H04L 9/3278
See application file for complete search history.

(56) References Cited

U.S. PATENT DOCUMENTS

| 8,868,923 B1 | 10/2014 | Hamlet et al. |
| 2015/0195088 A1* | 7/2015 | Rostami ............... H04L 9/3278 380/28 |
| 2016/0269178 A1* | 9/2016 | Yang .................... H04L 9/3231 |

FOREIGN PATENT DOCUMENTS

| WO | 2007036822 A1 | 4/2007 |
| WO | 2010116310 A1 | 10/2010 |

(Continued)

OTHER PUBLICATIONS

Bissessar et al., "Using Biometric Key Commitments to Prevent Unauthorized Lending of Cryptographic Credentials," Twelfth Annual Conference on Privacy, Security and Trust (PST), 2014, pp. 75-83.

(Continued)

Primary Examiner — Brian F Shaw
(74) Attorney, Agent, or Firm — Workman Nydegger

(57) ABSTRACT

An authentication method includes an enrolment stage comprising: receiving fuzzy data from a noisy authentication factor and fixed authentication data; generating a secret string independently from the received fuzzy data and the received fixed authentication data; deriving metadata from the fuzzy data and the secret string and helper data from the secret string and metadata; encrypting the helper data using the fixed authentication data as encryption key; outputting the encrypted helper data as public data, and an authentication stage including receiving the public data output during the enrolment stage, decrypting the received public data using the fixed authentication data as decryption key, recovering the helper data and the metadata from the decrypted public data, reproducing the secret string using the further (Continued)

fuzzy data and the recovered metadata, validating the reproduced secret string using the recovered helper data, and releasing the reproduced secret string if the validating yields a positive outcome.

18 Claims, 11 Drawing Sheets

(56) References Cited

FOREIGN PATENT DOCUMENTS

| | | |
|---|---|---|
| WO | 2015153559 A1 | 10/2015 |
| WO | 2015200196 A1 | 12/2015 |
| WO | 2016058793 A1 | 4/2016 |

OTHER PUBLICATIONS

Dodis et al., "Fuzzy Extractors: How To Generate Strong Keys From Biometrics and Other Noisy Data," Society for Industrial and Applied Mechanics Journal on Computing, vol. 38, No. 1, 2008, pp. 97-139.

Rathgeb et al., "Multi-Biometric Template Protection: Issues and Challenges," New Trends and Developments in Biometrics, Chapter 8, INTECH, 2012, pp. 172-190.

Great Britain Search Report from GB Application No. 1618360.0, dated Apr. 26, 2017.

Great Britain Search Report from GB Application No. 1618556.3, dated Jun. 21, 2017.

International Search Report from PCT Application No. PCT/EP2017/077418, dated Jan. 4, 2018.

\* cited by examiner

AUTHENTICATION METHOD AND SYSTEM

FIELD OF THE INVENTION

The present invention is generally related to the field of user authentication systems and methods. In particular, it relates to a biometric authentication method.

BACKGROUND OF THE INVENTION

Traditional cryptography relies on keys, which are chosen uniformly at random and then remain fixed. This means that, in order to use noisy identification factors, such as biometrics or Physically Unclonable Functions (PUFs), as keys for cryptographic primitives, one first needs to transform these inherently noisy sources into a stable string which is indistinguishable from a random string.

This has been partially achieved by the fuzzy extractor construction, formally introduced by Dodis et al. in "*Fuzzy extractors: How to generate strong keys from biometrics and other noisy data*" (SIAM J. Comput., vol. 38, no. 1, pp. 97-139, 2008). However, the outputs produced by this construction leak information about the noisy source, which can be used to perform a linkability attack.

WO2015/153559 presents a biometric security server and a secure device. A user is enrolled with the security server by collecting a biometric sample of the user and transforming the biometric sample to create and store a transformed enrollment biometric. A request to exchange information encrypted based on a biometric sample of the user is received from the secure device and a secure sketch output is generated from the transformed enrollment biometric and transmitted to the secure device. The secure sketch output has a measurement difference encoding portion and an error correction encoding portion. The secure device collects a local biometric sample and decodes the local biometric sample using the received secure sketch output. In the helper string generator module the generated public helper data is, however, not protected. As such it has both security and privacy vulnerabilities. The secure sketch which is part of the helper string, remains in this approach linkable to a same user.

WO2015/200196 discloses solutions for binding metadata, such as information derived from the output of a biometric sensor, to hardware intrinsic properties by obtaining authentication-related metadata and combining it with information pertaining to a root of trust, such as a PUF. The metadata may be derived from a sensor such as a biometric sensor, the root of trust may be a PUF, the combination of the metadata and root of trust information may employ a hash function, and output from such a hash process may be used as an input to the root of trust.

U.S. Pat. No. 8,868,923 is concerned with multi-factor authentication. A cryptographic fingerprint unit within a hardware device for authenticating a user of the hardware device. The cryptographic fingerprint unit includes an internal PUF circuit disposed in or on the hardware device, which generates a PUF value. Combining logic is coupled to receive the PUF value, combines the PUF value with one or more other authentication factors to generate a multi-factor authentication value.

WO2016/058793 relates to an electronic cryptographic device for an enrollment phase and a later use phase. The device generates a first PUF data during the enrollment phase, derived from a first noisy bit string of the PUF. The first PUF data both uniquely identifies the physically unclonable function and comprises first helper data, that may later be used to correct for noise in the noisy output of the PUF. A second PUF data is derived from a second noisy bit string generated by the PUF. The second PUF data may comprise part of the noisy bit string to identify the PUF.

Therefore there is a need for novel systems and methods for secure and privacy-preserving user authentication.

SUMMARY OF THE INVENTION

It is an object of embodiments of the present invention to provide for methods and systems for authentication with enhanced privacy and security properties.

The above objective is accomplished by the solution according to the present invention.

In a first aspect the invention relates to an authentication method comprising an enrolment step comprising:
  receiving fuzzy data from a noisy authentication factor and fixed authentication data,
  generating a secret string independently from the received fuzzy data and the received fixed authentication data,
  deriving metadata from the fuzzy data and the secret string and helper data from the secret string and the metadata,
  encrypting the helper data using said fixed authentication data as encryption key,
  outputting the encrypted helper data as public data,
and an authentication step comprising
  receiving the public data output during the enrolment step, further fuzzy data and said fixed authentication data,
  decrypting said received public data using said fixed authentication data as decryption key,
  recovering the helper data and said metadata from the decrypted public data,
  reproducing the secret string using the further fuzzy data and the recovered metadata,
  validating the reproduced secret string using the recovered helper data,
  releasing the reproduced secret string if said validating yields a positive outcome.

The proposed solution indeed allows for strengthening and uncoupling the outputs from the noisy source, while preserving security and privacy. The key feature to achieve this is the incorporation of the fixed authentication data as a second authentication factor, on top of the noisy authentication factor used to obtain the fuzzy data at the input of the proposed method. As the secret string is generated independently from the received fuzzy data and the received fixed authentication data, there is a complete uncoupling between the secret string and the received fuzzy data and fixed authentication data.

In preferred embodiments the entropy of the fuzzy data given the metadata is greater than or equal to the length of the secret string.

Preferably no information about the fuzzy data can be derived from the public data information by computation. In one embodiment the mutual information between the fuzzy data and the public data is zero.

In embodiments of the invention the output public data is stored in a personal device.

In further embodiments the output public data is stored in a server.

Alternatively, or combined with previously described embodiments, the output public data is stored in a token.

In preferred embodiments the fuzzy data is provided by a biometric source.

In embodiments the fuzzy data is provided by a physically unclonable function, PUF, source. The PUF may be a strong PUF provided with a fixed challenge or a weak PUF.

In embodiments also said secret string is output in the enrolment step.

Advantageously, the fuzzy data and/or said further fuzzy data is acquired either simultaneously or consecutively. The fuzzy data and/or said further fuzzy data may be provided by a combination of biometric sources and/or PUF sources.

In preferred embodiments the fixed authentication data is stored in a file or in an authentication token, or is derived from password or a passphrase. In one embodiment the fixed authentication data is a combination of a plurality of fixed authentication data, acquired either simultaneously or consecutively.

In embodiments the secret string is generated using a random generator.

In another aspect the invention relates to an authentication system comprising:
  means for enrolment adapted to:
    receive fuzzy data from a noisy authentication factor and fixed authentication data,
    generate a secret string independently from said received fuzzy data and said received fixed authentication data,
    derive metadata from said fuzzy data and said secret string and helper data from said secret string and said metadata,
    encrypt said helper data using said fixed authentication data as encryption key,
    output said encrypted helper data as the public data,
  means for authentication adapted to:
    receive said public data output, further fuzzy data and said fixed authentication data,
    decrypt said received public data using said fixed authentication data as decryption key,
    recover said helper data and said metadata from said decrypted public data,
    reproduce said secret string using said further fuzzy data and said recovered metadata,
    validate said reproduced secret string using said recovered helper data,
    release said reproduced secret string if said validating yields a positive outcome.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

FIG. 1A illustrates the generation procedure (referred to as "Gen Procedure") and FIG. 1B the reproduction procedure (referred to as "Rep Procedure").

DETAILED DESCRIPTION OF ILLUSTRATIVE EMBODIMENTS

Figure 1A:
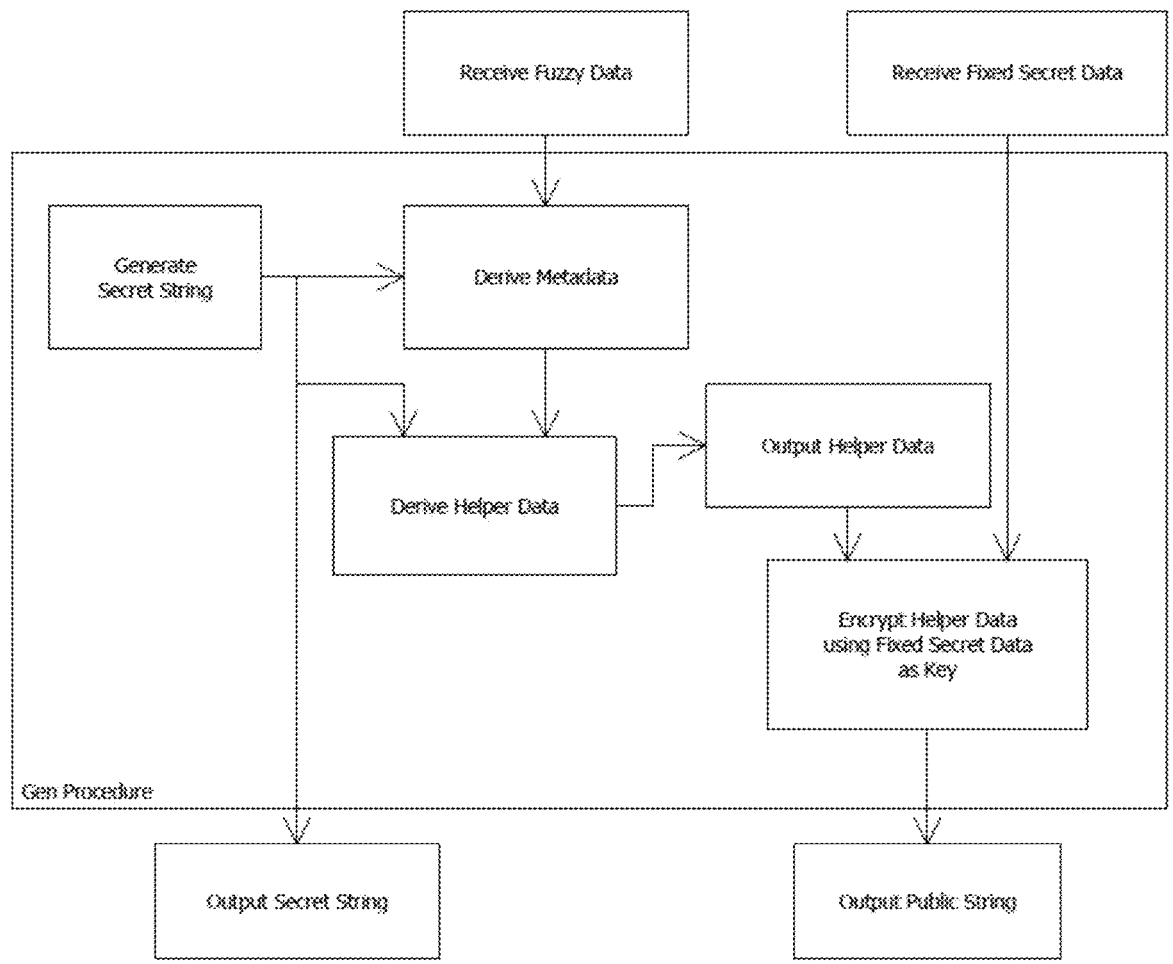
FIGS. 1A and 1B represent a high level scheme of an embodiment of the authentication system of the invention.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention proposes a construction to strengthen and uncouple the outputs of the construction from the noisy source by incorporating a fixed second authentication factor.

Figure 1B:
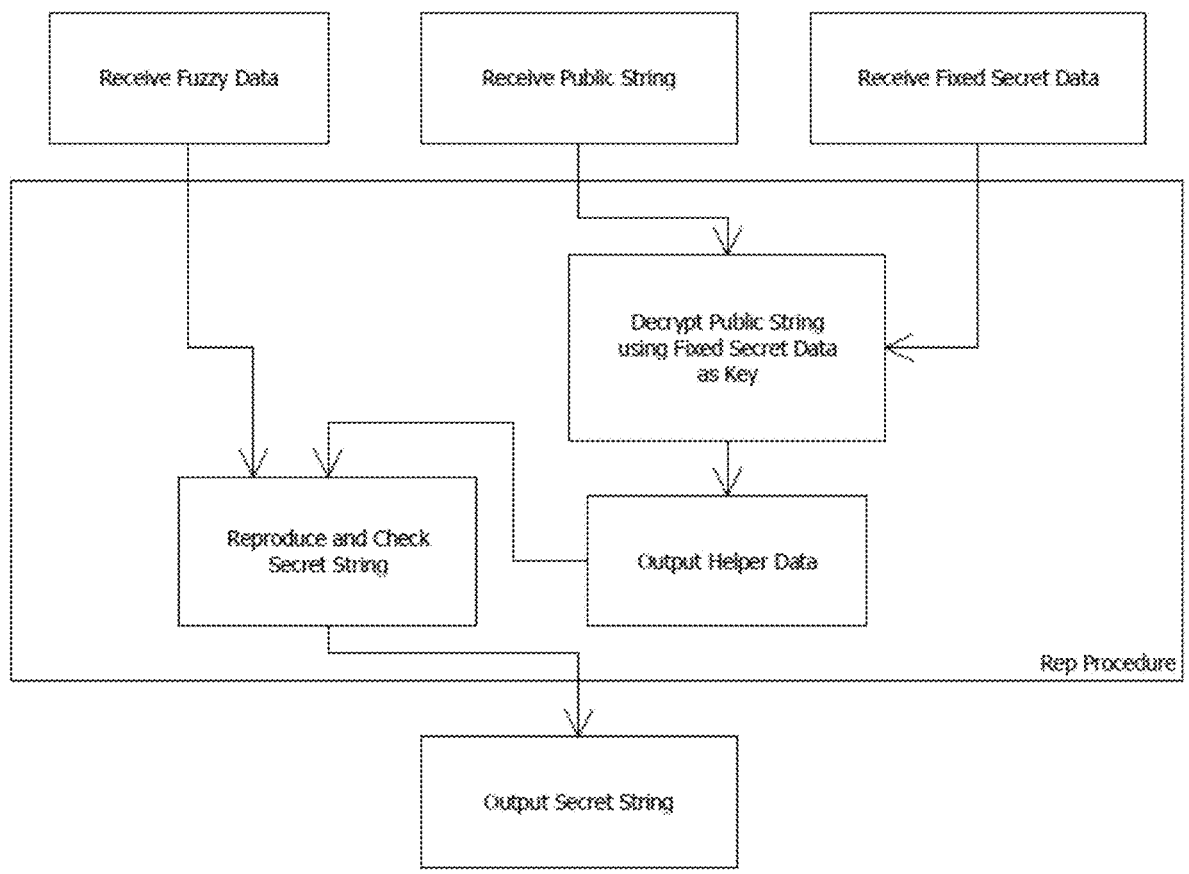

An overview of the proposed approach is provided in FIGS. 1A and 1B. The first authentication factor is the biometric data used to build a model of an individual. Fuzzy data representing an estimate of that model is received as a first input. A secret string is generated using a random generator. Metadata is derived from the received fuzzy data and a representation of the secret string. Both the metadata and the secret string are then used to derive helper data. More precisely, the helper data contains the metadata, a hash of the secret string and a hash descriptor. The helper data is next encrypted using the second input required in the generation procedure, i.e. a fixed secret data. The resulting data is the public data string which is made available as output. The second output of the generation procedure is the generated secret string.

FIG. 1B illustrates what happens in the reproduction stage. The outputs of the generation phase are received, i.e. the fixed secret string and the public data string. Also fuzzy data is received as further input to the reproduction procedure. The public data is decrypted using the same fixed secret authentication key as used in the generation procedure. In this way the helper data comprising the metadata, hash descriptor and hash of the secret string is recovered. This metadata is used together with the received fuzzy data for determining an estimate secret string which is subsequently checked for validity. If this yields a positive result, the estimate secret string is output.

The main advantages of the proposed approach with respect to the state of the art can be summarized as follows: (1) the same fuzzy data can be utilized among different systems producing completely independent secret strings and unlinkable public strings; (2) the disclosure of the fuzzy data source does not pose a threat to security if the fixed authentication factor is not disclosed; (3) the disclosure of the fixed authentication factor does not pose a threat to security if the fuzzy data source is not disclosed; (4) the disclosure of the secret string does not reveal information about the fuzzy data or the fixed authentication factor.

Figure 2:
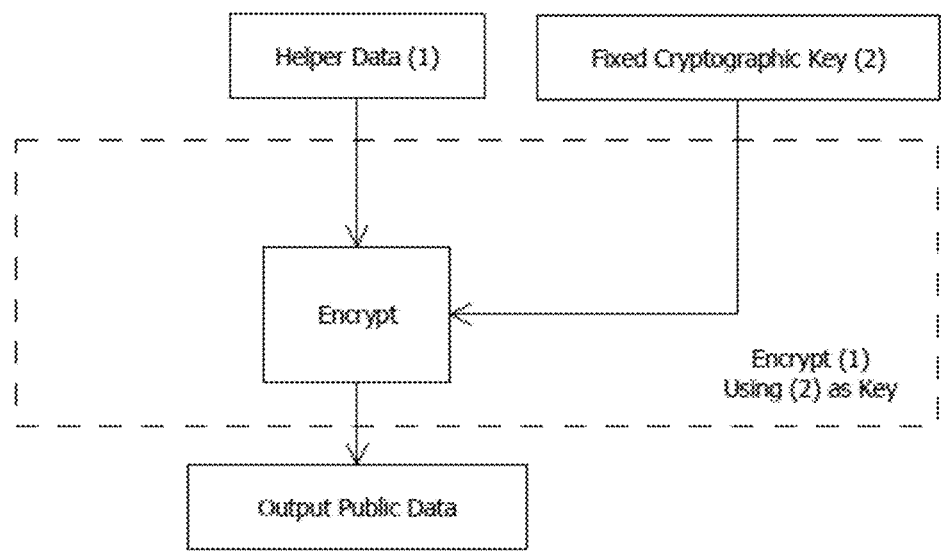
FIG. 2 illustrates the encryption of helper data with a cryptographic key.

In FIG. 2 a fixed cryptographic key is used as fixed authentication data. Once the helper data has been derived, it is encrypted using the fixed cryptographic key.

Figure 3:
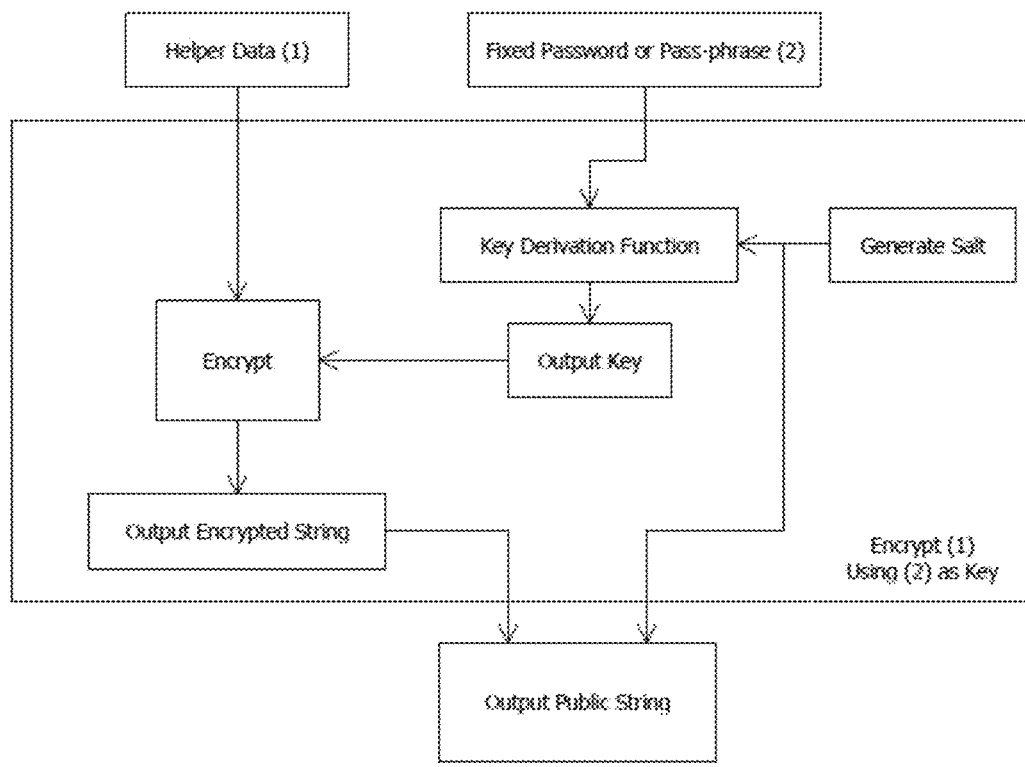
FIG. 3 illustrates the encryption of helper data with a password or passphrase.

The fixed authentication data can in another embodiment be obtained via a password or passphrase. FIG. 3 illustrates the encryption of the helper data using a password or passphrase as fixed secret data in the generation stage. In the embodiment shown in FIG. 3 a unique salt is generated for deriving the symmetric key K (and also the signing key). In this way it is guaranteed there is enough randomness as input for the key derivation function. The encrypted helper data forms the output public string, together with the generated salt.

Figure 4:
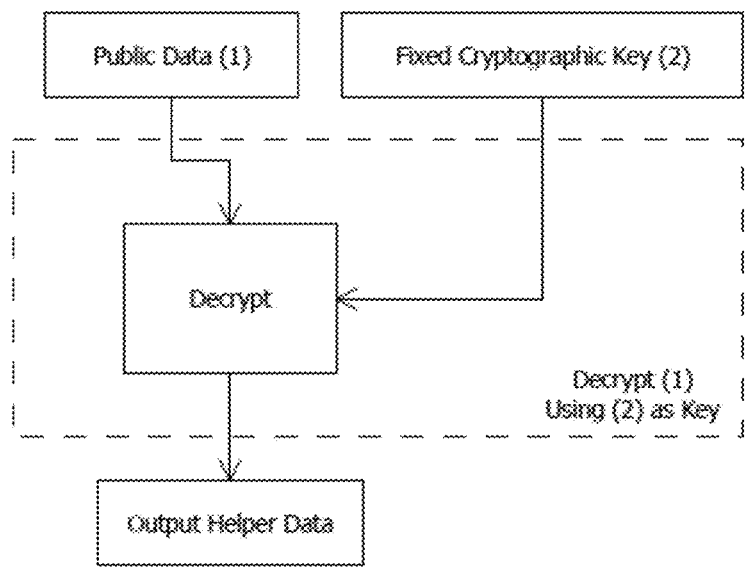
FIG. 4 illustrates the decryption corresponding to the encryption of FIG. 2.
Figure 5:
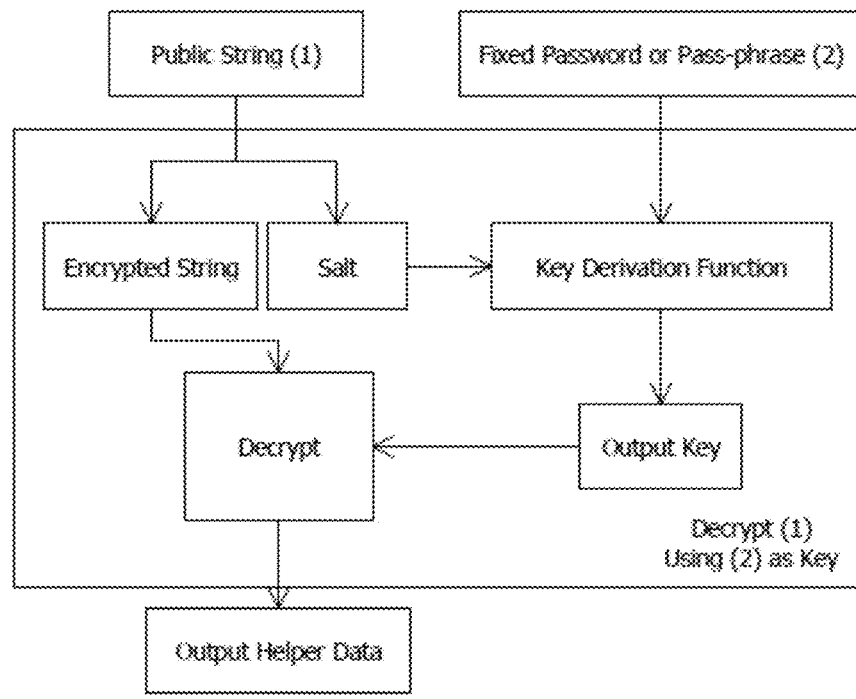
FIG. 5 illustrates the decryption corresponding to the encryption of FIG. 3.

FIG. 4 and FIG. 5 Illustrate the decryption in the reproduction stage corresponding to FIGS. 2 and 3, respectively. In FIG. 4 the receives public data is decrypted using the fixed crytographic key which is also one of the inputs of the reproduction procedure. In the embodiment of FIG. 5 the received public string not only contains the encrypted string of helper data but also the salt needed in the key derivation function.

Figure 6:
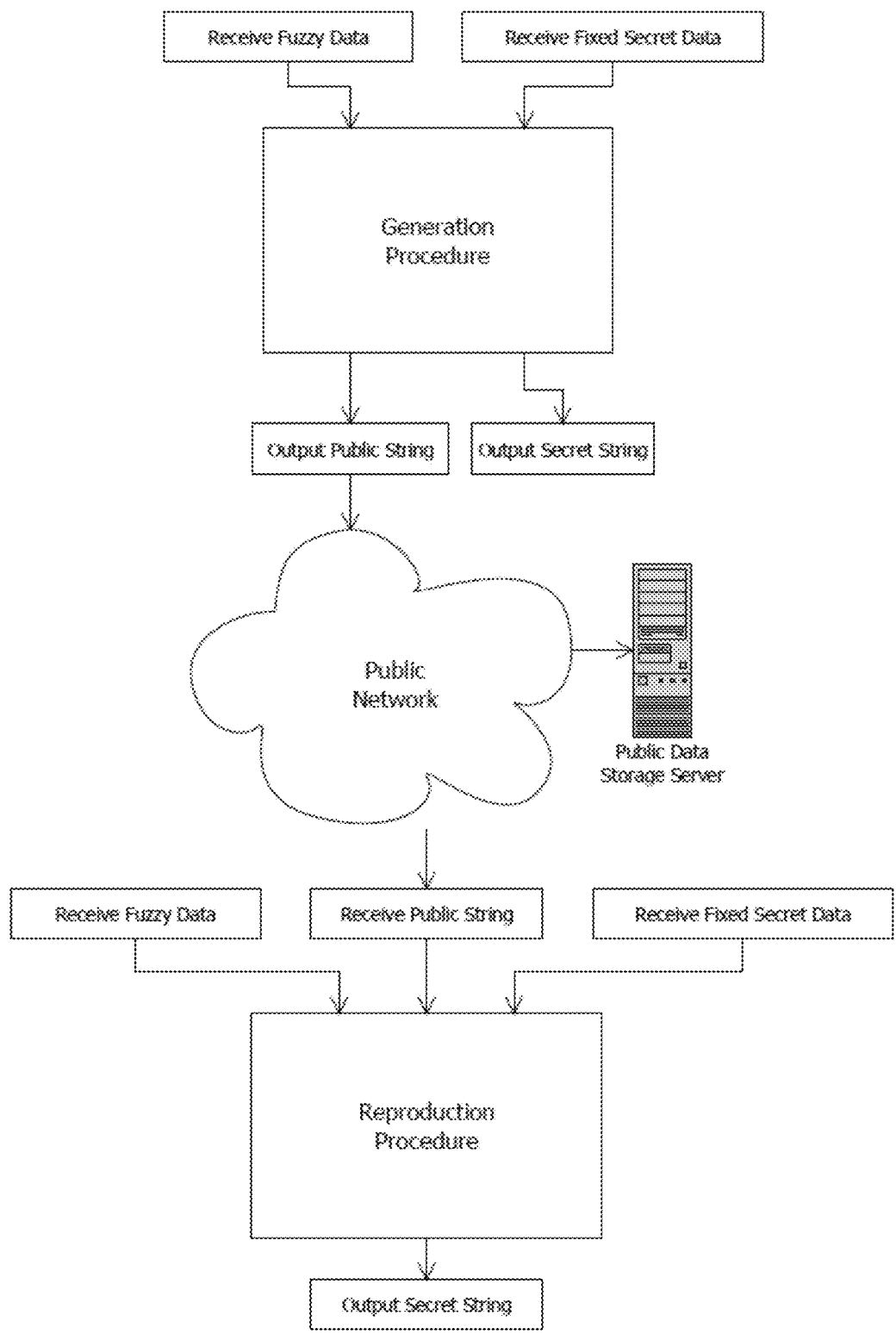
FIG. 6 illustrates the public string produced in the generation procedure being transmitted through a public network, stored in a public data server storage and received by the reproduction procedure.
Figure 7:
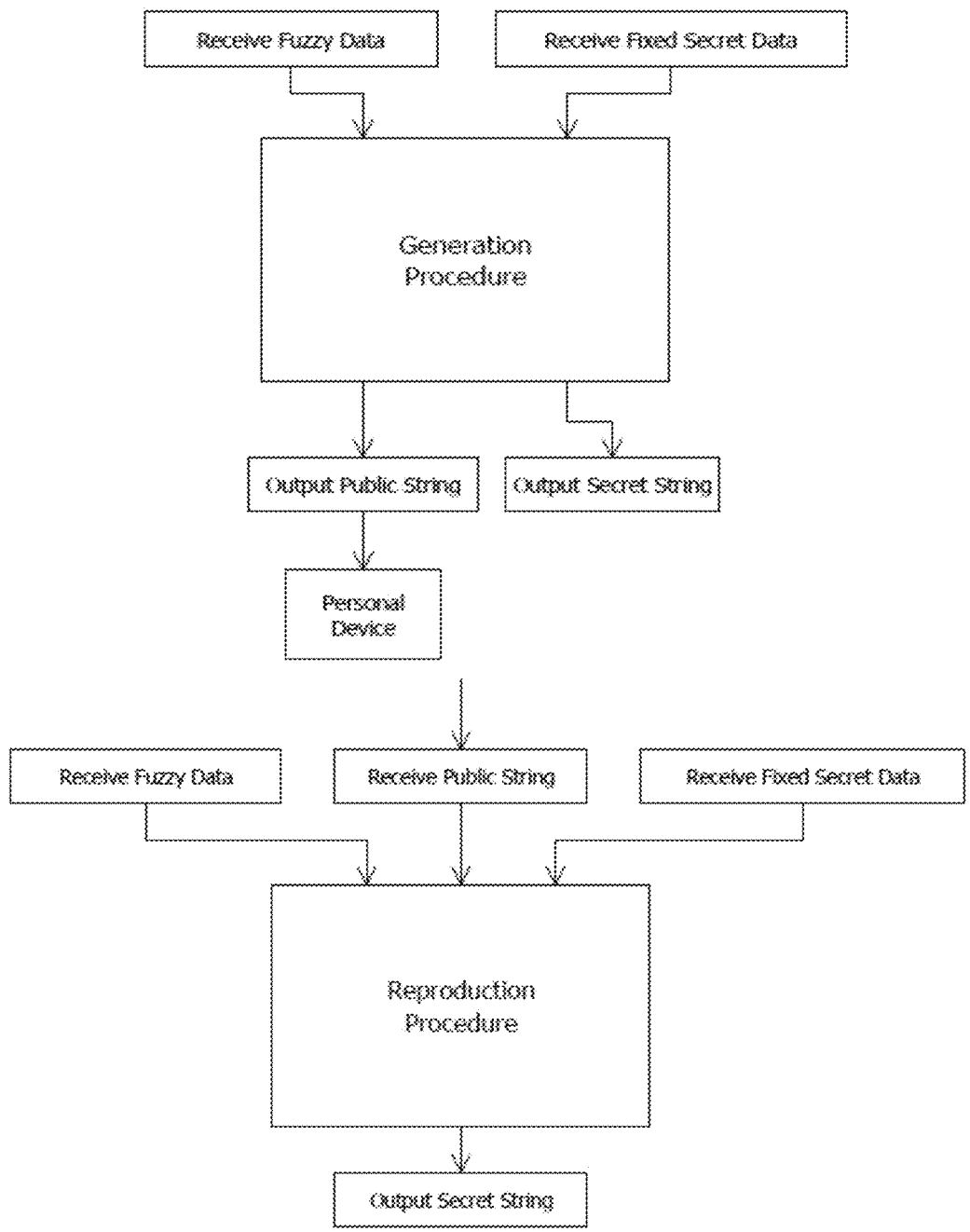
FIG. 7 illustrates the public string stored in a personal device and received by the reproduction procedure.
Figure 8:
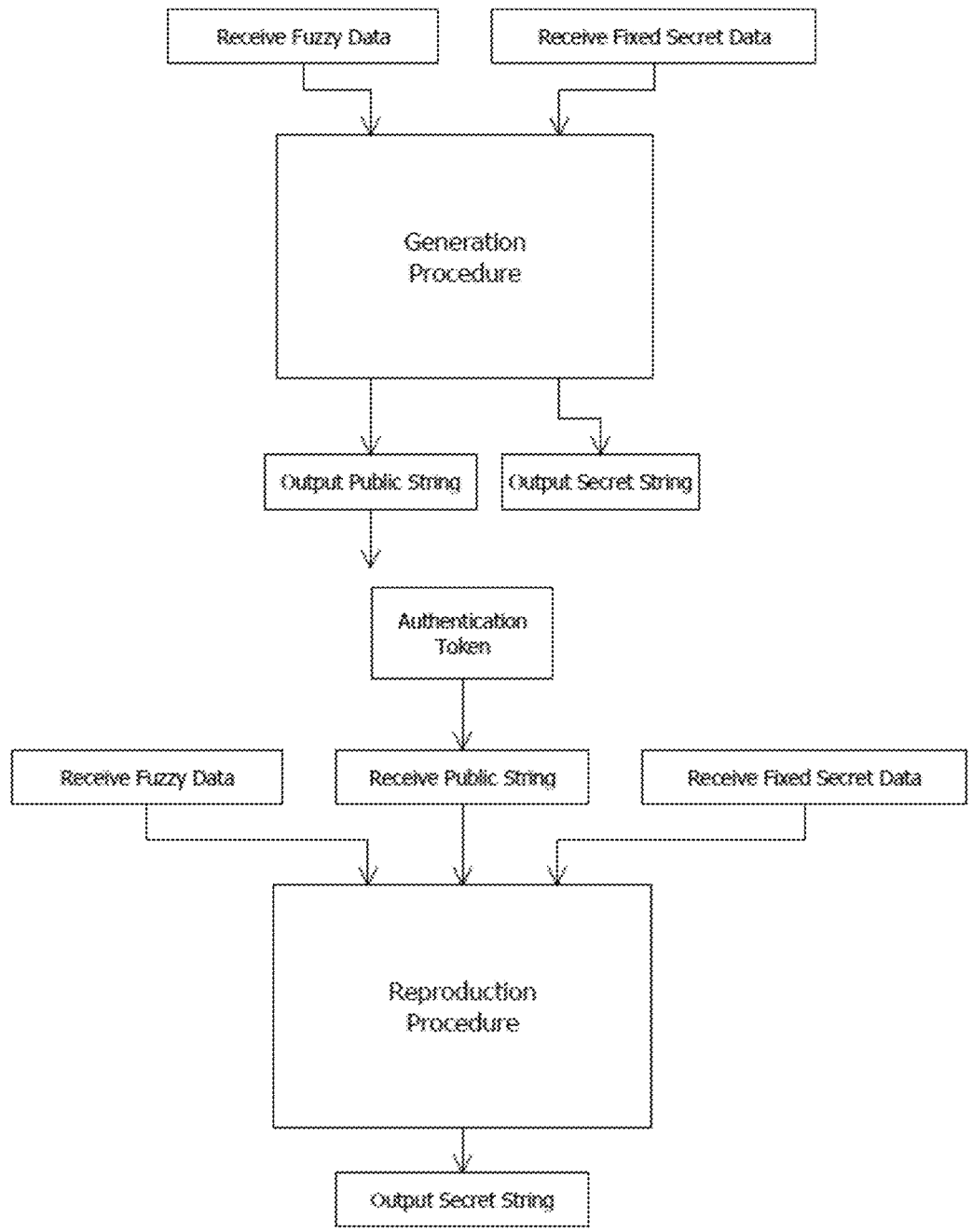
FIG. 8 illustrates the public string stored in an authentication token and received by the reproduction procedure.

In one embodiment the public data is transmitted through a public network and stored in a public data storage server as illustrated in FIG. 6. An alternative is shown in FIG. 7, where the public string is stored in a personal device. This is called a possession based approach. Another example of a possession based solution is illustrated in FIG. 8, where the output public string is stored in an authentication token.

Figure 9A:
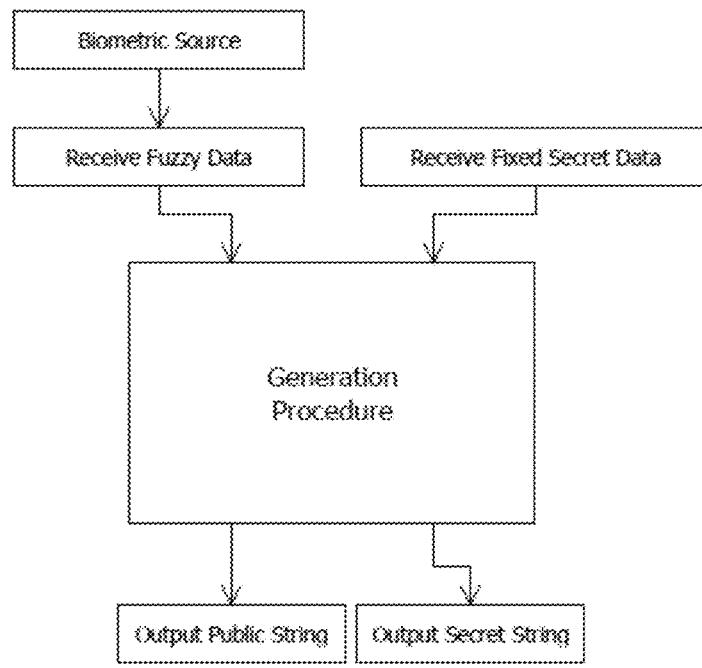
FIGS. 9A and 9B illustrate the fuzzy data being provided by a biometric source to the generation procedure and the reproduction procedure, respectively.
Figure 9B:
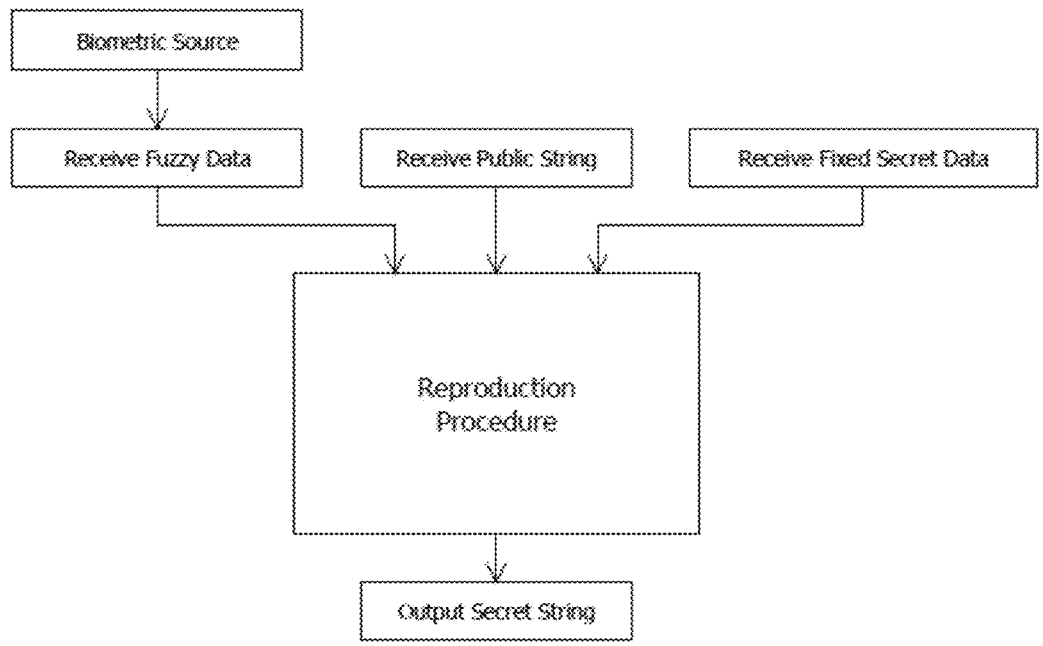
Figure 10:
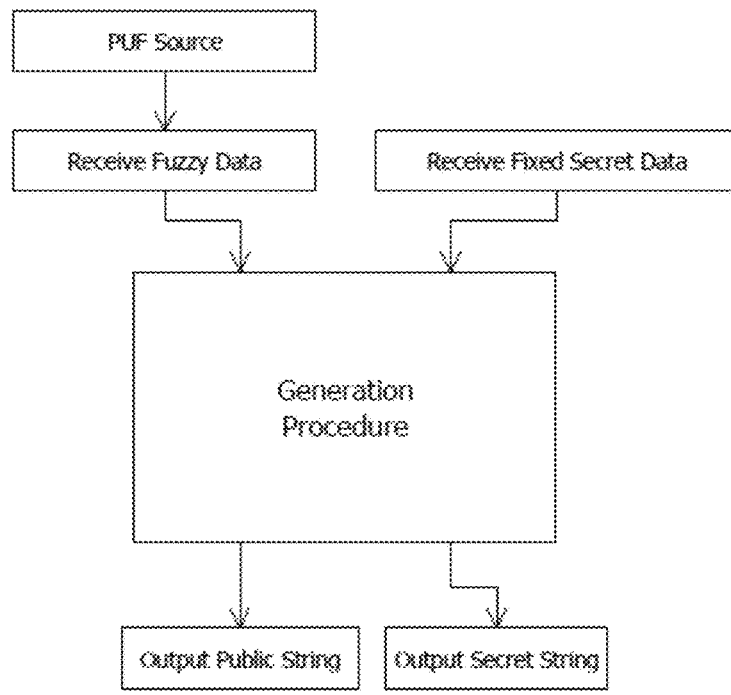
FIG. 10 illustrates a PUF source providing the fuzzy data to the generation procedure.
Figure 11:
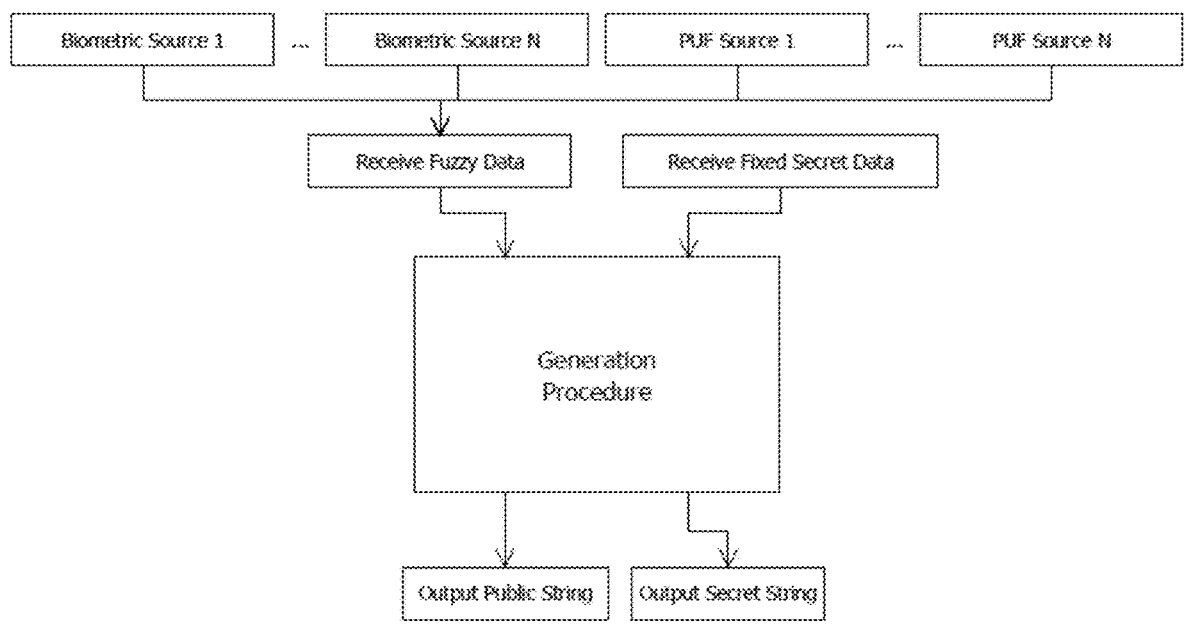
FIG. 11 illustrates a combination of several biometric sources and PUF sources to the generation procedure.

The fuzzy data to be used in the generation procedure can be provided by a biometric source as illustrated in FIG. 9A. Also the fuzzy date for the reproduction can come from a biometric source (FIG. 9B). In the embodiment shown in FIG. 10 it is a physically unclonable function (PUF) source from which the fuzzy data are received. The PUF may be a so called weak PUF. Alternatively a strong PUF may be used, provided with a fixed challenge. Obviously, also the fuzzy data used in the reproduction procedure can be supplied via a PUF source. In FIG. 11 a number of biometric sources and PUF sources are combined. This may evidently also be the case at the reproduction side.

A weak PUF, also known as physically obfuscated keys, can be understood as a physically unclonable function that outputs a noisy key, also known as fingerprint, of a physical circuit. This output is fixed, ignoring the noise, and can be used for cryptographic purposes.

A strong PUF differs from weak PUFs in the sense that the output noisy key depends on an input signal, commonly known as challenge, which can take a wide range of values. This makes strong PUFs able to output a wide range of noisy keys.

The proposed method allows protecting part of the entropy provided by the fuzzy data. This is achieved by using a parameterized mapping function that derives metadata from the fuzzy data and a target representation, which can be randomly chosen. The derived metadata can reveal information from the fuzzy data, but at least an amount of information equivalent to the entropy of the target representation remains undisclosed. In other words, the entropy of the fuzzy data given the produced metadata is greater than or equal to the length of the target representation.

A strengthened uncoupled extractor based on the use of symmetric encryption, hash functions and error correcting codes is now described in a formal way.

Definition 1: Error Correcting Codes

An ($\mathcal{C}$, n, k, t)-error correcting code consists of two functions:
(1) ECCenc: $\mathcal{C}^k \to \mathcal{C}^n$. This function takes as input a message $m \in \mathcal{C}^k$ and returns a codeword w=ECCenc(m)$\in \mathcal{C}^n$.
(2) ECCdec: $\mathcal{C}^n \to \mathcal{C}^k$. This function takes as input $w' \in \mathcal{C}^n$ and returns a message $m \in \mathcal{C}^k$, if $d_{\mathcal{C}}(w, w') \leq t$ and ECCenc(m)=w, where $d_{\mathcal{C}}(\bullet, \bullet)$ is a distance in $\mathcal{C}^n$.

Definition 2: Binary Error Correcting Code

An (n, k, t)-binary error correcting code is an ($\{0,1\}$, n, k, t)-error correcting code. In this case $d_{\{0,1\}}$ is the Hamming distance.

Definition 3: Symmetric Encryption Scheme

A ($\mathcal{K}$, $\mathcal{P}$, $\varepsilon$, $\Lambda$)-symmetric encryption scheme is defined by a 3-tuple (KeyGen, ENC, DEC) of functions. The key generation function is a probabilistic procedure KeyGen: $\Lambda \to \mathcal{K}$ generates the encryption and decryption key $K \in \mathcal{K}$ using a security parameter $\lambda \in \Lambda$ as input, i.e., K=KeyGen($\lambda$). The encryption function ENC: $\mathcal{K} \times \mathcal{P} \to \varepsilon$ takes as input a plaintext $p \in \mathcal{P}$ and a key $K \in \mathcal{K}$ and outputs a ciphertext $\in \varepsilon$, i. e., e=ENC(K, p). The decryption function DEC: $\mathcal{K} \times \varepsilon \to \mathcal{P}$ takes as input a ciphertext $e \in \varepsilon$ and a key $K \in \mathcal{K}$ and outputs a plaintext $p \in \mathcal{P}$, i. e., p=DEC(K, e).

Definition 4: Perfect Security

An encryption scheme (KeyGen, ENC, DEC) over a plaintext space $\mathcal{P}$ is called perfectly secure if for every probability distribution over $\mathcal{P}$, every message $p \in \mathcal{P}$ and every encrypted text or ciphertext $e \in \varepsilon$ for which Pr{E=e}>0

$$Pr\{P=p|E=e\}=Pr\{P=p\}. \quad (1)$$

Definition 5: Negligible Function

A function negl: $\mathbb{N} \to [0,1]$ is called negligible if for all positive polynomials poly and all sufficiently large $\lambda \in \mathbb{N}$, one has negl($\lambda$)<1/poly($\lambda$).

Definition 6: Universal One-Way Hash Functions

Let $\{n_1\}$ and $\{n_0\}$ be two increasing sequences such that $n_{0_i} \leq n_{1_i}$, $\forall i$, but $\exists q$ a polynomial such that $q(n_{0i}) \geq n_{1i}$. Let $H_k$ be a collection of functions such that $\forall h \in H_k$, h: $\mathcal{C} \cdot \mathcal{C}^{n_{oi}}$, and let $\mathcal{U} = \cup_k H_k$. Let $\mathcal{A}$ be a probabilistic polynomial time (PPT) adversary, that on input k outputs an initial value $x \in \mathcal{C}^{n_{1k}}$. Then, given a random $h \in H_k$, $\mathcal{A}$ attempts to find $y \in \mathcal{C}^{n_{1k}}$ such that h(y)=h(x), but $x \neq y$. $\mathcal{U}$ is called a family of universal one-way functions if for all $\mathcal{A}$:

1) If $x \in \mathcal{C}^{n_{1k}}$ is $\mathcal{A}$'s initial value, then:

$$Pr\{\mathcal{A}(h,x)=y, h(x)=h(y), x \neq y\} < negl(n_{1k}). \quad (2)$$

2) $\forall h \in H_k$ there is a description of h of length polynomial in $n_{1k}$ such that given h's description and x, h(x) is computable in polynomial time.

3) $H_k$ is accessible: there exists an algorithm G such that on input k, G generates uniformly at random a description of $h \in H_k$.

Definition 7: Population

A population $\mathcal{O} = \{O_1, \ldots, O_P\}$ is a set of a variable number of individuals (persons or objects) that share some common measurable characteristics.

Definition 8: Random Characterization of an Individual

Given a population of A function $ver_\mathcal{O}E$: $Q^E \times Q^V \to \{0,1\}$ that maps a vector of identically distributed E samples $q_x = [q_x^1, \ldots, q_x^E] \sim Q_x^E$, where $q_x^i \sim Q_x$ from a random characterization $Q_x$ of an individual $O_x$ and a vector of identically distributed samples $q_y = [q_y^1, \ldots, q_y^V] \sim Q_y^V$, where $q_y^i \sim Q_y$ from a random characterization of an individual $O_y$ to a decision on whether the two individuals' identities are the same, is called (Q, E, V, FAR, FAR)-samples-based verifier characterized by the following error probabilities: individuals $\mathcal{O}$, a random characterization of an individual $O_x \in \mathcal{O}$ is a random variable obtained as a noisy measurement of some characteristics of the individual which are common among the individuals in the population: $Q_x$=measure($O_x$)$\in Q$. The result of a specific measurement from $O_x$ is a sample of this random variable and it is noted as $q_x \sim Q_x$.

Definition 9: Model

A model $M_x \in \mathcal{M}$ of an individual $O_x \in \mathcal{O}$ is a parametric description of the individual in the measurement space $Q$.

Definition 10: Model Estimation Function

A function model: $Q^E \to \mathcal{M}$ that maps a vector of samples $q_x = [q_x^1, \ldots, q_x^E]$, where $q_x^i \sim Q_x$ from a random characterization of an individual $O_x$ to an estimate of the model $M_x$ of the individual $\tilde{m}_x$=model($q_x$)$\in \mathcal{M}$, is called a model estimation function. It has to be noted that $\tilde{m}_x$ is a realization of the random variable $\tilde{M}_x$=model($Q^E$), i. e., $\tilde{m}_x \sim \tilde{M}_x$.

Definition 11: Samples-Based Verifier

A function $ver_{Q^E}$: $Q^E \times Q^V \to \{0,1\}$ that maps a vector of identically distributed E samples $q_x = [q_x^1, \ldots, q_x^E] \sim Q_x^E$, where $q_x^i \sim Q_x$ from a random characterization $Q_x$ of an individual $O_x$ and a vector of identically distributed samples $q_y = [q_y^1, \ldots, q_y^V] \sim Q_y^V$, where $q_y^i \sim Q_y$ from a random characterization of an individual $O_y$ to a decision on whether the two individuals' identities are the same, is called (Q, E, V, FAR, FAR)-samples-based verifier characterized by the following error probabilities:

$$Pr\{ver_{Q^E, Q^V}(Q_x^E, Q_y^V)=0 | O_x=O_y\}=FRR$$

$$Pr\{ver_{Q^E, Q^V}(Q_x^E, Q_y^V)=1 | O_x \neq O_y\}=FAR$$

where FRR denotes False Rejection Rate and FAR False Acceptance Rate.

Definition 12: Model-Based Verifier

A function $ver_{\mathcal{M}}$: $\mathcal{M} \times Q^V \to \{0,1\}$ mapping a model estimation $\tilde{m}_x$ of an individual $O_x$ and a vector of identically distributed samples $q_y = [q_y^1, \ldots, q_y^V] \sim Q_y^V$, where $q_y^i \sim Q_y$ from a random characterization of an individual $O_y$, to a decision on whether the identities of $O_x$ and $O_y$ are the same, is called a ($Q$, $\mathcal{M}$, V, FAR, FRR)-model-based verifier, characterized by the following error probabilities:

$$Pr\{ver_{\mathcal{M}, V}(\tilde{M}_x, Q_y^V)=0 | O_x=O_y\}=FRR \quad (3)$$

$$Pr\{ver_{\mathcal{M}, V}(\tilde{M}_x, Q_y^V)=1 | O_x \neq O_y\}=FAR \quad (4)$$

A samples-based verifier can be derived from a model-based verifier and its corresponding model estimation function as: $ver_{Q^E, Q^V}(q_x, q_y) = ver_{\mathcal{M}, V}(model(q_x), q_y)$. The following definitions are only given in their model-based form, but sample-based forms can be trivially derived by using the corresponding model estimation function.

Definition 13: Model-Based Uncoupling Construction

A construction {ME, PM} comprising:
(i) a metadata extractor function ME: $\mathcal{M} \times \mathcal{C}^n \to \mathcal{P}$, and
(ii) a parameterized mapping function PM: $\mathcal{Q}^V \times \mathcal{P} \to \mathcal{C}^n$,
is a $(\mathcal{Q}, \mathcal{M}, \mathcal{P}, \mathcal{C}, V, n)$-model-based uncoupling construction if, given the random variable $\tilde{M}_x = \text{measure}(Q_x^E)$, a random target representation $c \sim C \in \mathcal{C}^n$ independent from $\tilde{M}_x$ and the random variable $P_{\tilde{M}_x,C} = ME(\tilde{M}_x, C)$, the following equations hold:

$$I_{|\mathcal{C}|}(C, P_{\tilde{M}_x,C}) = 0, \quad (5)$$

$$I_{|\mathcal{C}|}(\tilde{M}_x, P_{\tilde{M}_x,C}) \leq H_{|\mathcal{C}|}(\tilde{M}_x) - n, \quad (6)$$

where $I_{|\mathcal{C}|}(\cdot, \cdot)$ is the mutual information and $H_{|\mathcal{C}|}(\cdot)$ the entropy.

The output of the metadata extractor function ME is denoted in the following simply as metadata, whereas the output of the parameterized mapping function PM is denoted as target representation.

Definition 14: Uncoupled Model-Based Verifier

A function $\text{ver}_{ME,PM}$: $\mathcal{M} \times \mathcal{Q}^V \to \{0,1\}$ defined as:

$$\text{ver}_{ME,PM}(\tilde{m}_y, q_x) = \begin{cases} 1 & \text{if } d_C(c, \tilde{c}) \leq t \\ 0 & \text{otherwise} \end{cases}$$

where $\tilde{m}_y \sim \tilde{M}_y \in \mathcal{M}$, is an estimate of a model of an individual $O_y \in \mathcal{O}$, $q_x = [q_x^1, \ldots, q_x^V] \sim Q_x^V$, where $q_x^i \sim Q_x$, is a vector of identically distributed samples from a random characterization $Q_x$ $O_x \in \mathcal{O}$, $c \in \mathcal{C}^n$ is a random string independent from $\tilde{m}_y$, {ME, PM} is a $(\mathcal{Q}, \mathcal{M}, \mathcal{P}, \mathcal{C}, V, n)$-model-based uncoupling construction, $p_{\tilde{m}_y,c} = ME(\tilde{m}_y, c)$, and $\tilde{c} = PM(q_x, p_{\tilde{m}_y,c})$, is called a $(\mathcal{Q}, \mathcal{M}, \mathcal{P}, \mathcal{C}, V, n, t, FAR, FRR)$-uncoupled model-based verifier characterized by the following error probabilities:

$$Pr\{\text{ver}_{ME,PM}(\tilde{M}_y, Q_x^V) = 0 | O_x = O_y\} = FRR \quad (7)$$

$$Pr\{\text{ver}_{ME,PM}(\tilde{M}_y, Q_x^V) = 1 | O_x \neq O_y\} = FAR \quad (8)$$

Definition 15: Strengthened Uncoupled Extractor

The procedures (Gen, Rep) constitute a $(\mathcal{K}, \mathcal{Q}, \mathcal{M}, \varepsilon, \mathcal{C}, V, n, k, FAR, FRR)$-uncoupled extractor when the following conditions hold:

1) Gen is a probabilistic generation procedure Gen: $\mathcal{K} \times \mathcal{M} \to \varepsilon \times \mathcal{C}^k$ which, on input $(K, \tilde{m}_y)$ (where $K \in \mathcal{K}$ is a fixed secret and $\tilde{m}_y \sim \tilde{M}_y \in \mathcal{C}$ is an estimate of the model $M_y \in \mathcal{C}$ of an individual $O_y \in \mathcal{O}$), outputs a public string $e \sim E \in \varepsilon$ and a secret string $s \sim S \in \mathcal{M}^k$, such that the mutual information between the inputs and the output is null, i.e.:
   (i) $I_{|\mathcal{C}|}(E, \tilde{M}_y) = 0$
   (ii) $I_{|\mathcal{C}|}(S, \tilde{M}_y) = 0$
   (iii) $I_{|\mathcal{C}|}(\tilde{M}_y, (K, E)) \leq H_{|\mathcal{C}|}(\tilde{M}_y) - n$.

In the case that a computationally secure encryption algorithm is used instead of an information theoretic secure one, conditions (i) and (ii) are replaced by:
   (i) It is computationally infeasible for a PPT adversary to recover any string related to the fuzzy data from the public string.
   (ii) It is computationally infeasible for a PPT adversary to recover any string related to the fuzzy data from the secret string.

2) Rep is a function defined as Rep: $\mathcal{K} \times \varepsilon \times \mathcal{Q}^V \to \mathcal{C}^k \cup \{\emptyset\}$ which on input $(K, e, q_x)$, and given that $(e, s) = \text{Gen}(K, m_y)$, where $m_y \in \mathcal{M}$ is the estimate of the model $M_y$ of an individual $O_y \in \mathcal{O}$, then the following statements hold:
   (i) $\Pr\{\text{Rep}(K, e, Q_x^V) = \emptyset | O_x = O_y\} = FRR$
   (ii) $\Pr\{\text{Rep}(K, e, Q_x^V) = s | O_x = O_y\} = 1 - FRR$
   (iii) $\Pr\{\text{Rep}(K, e, Q_x^V) = s | O_x \neq O_y\} = FAR$
   (iv) $\Pr\{\text{Rep}(K, e, Q_x^V) = \emptyset | O_x \neq O_y\} = 1 - FAR$ 3) $\Pr\{\text{Rep}(K', e', Q_x^V) = s\} < \text{negl}(k)$ if $K' \neq K$ or $e' \neq e$.

Theorem 1: Strengthened uncoupled extractor from a model based uncoupling construction, an error correcting code, an universal one-way hash function and a symmetric encryption scheme Let
$\mathcal{U}$ be a family of universal one-way hash functions. Let $H \subset \mathcal{U}$ be the collection of functions in $\mathcal{U}$ from $\mathcal{C}^k$ to $\mathcal{K}$,
(KeyGen, ENC, DEC) be a $(\mathcal{C}, \mathcal{K} \times \mathcal{P} \times \mathcal{K}, \varepsilon)$-perfectly secure symmetric encryption scheme,
(ECCenc, ECCdec) be a $(\mathcal{U}, n, k, t)$-error correcting code,
and (ME, PM) be a $(\mathcal{Q}, \mathcal{M}, \mathcal{P}, n, FAR, FRR)$-model-based uncoupling construction with an associated $\text{ver}_{ME,PM}$ $(\mathcal{Q}, \mathcal{M}, \mathcal{P}, \mathcal{C}, V, n, t, FAR, FRR)$-uncoupled model-based verifier.

Then, the procedures:
Gen: $\mathcal{K} \times \mathcal{M} \to \varepsilon \times \mathcal{C}^k$, which takes as input a fixed secret $K \in \mathcal{K}$ and an estimate $\tilde{m}_y$ of a model $M_y \in \mathcal{M}$ of an individual $O_y \in \mathcal{O}$, samples a secret string $s \leftarrow U \mathcal{M}^k$ and a hash descriptor $h \leftarrow U_H$, and computes the hash of the secret string $\delta = h(s)$, the target representation $c = \text{ECCenc}(s)$, and the metadata $p_{\tilde{m}_y,c} = ME(\tilde{m}_y, c)$. Then, it builds the helper data $p_{\tilde{m}_y,c} \| \delta \| h$, where $\|$ stands for concatenation, computes the public string $e = \text{ENC}_K(p_{\tilde{m}_y,c} \| \delta \| h)$ and outputs the public string $e$ and the secret string $s$; and Rep: $\mathcal{K} \times \varepsilon \times \mathcal{Q}^V \to \mathcal{M}^k \cup \{\emptyset\}$, which takes as input the fixed secret $K \in \mathcal{K}$, the public string $e \in \varepsilon$, and a vector $q_x = [q_x^1, \ldots, q_x^V] \sim Q_x^V \in \mathcal{Q}^V$ of identically distributed samples from a random characterization $Q_x$ of an individual $O_x \in \mathcal{O}$, computes the helper data from the public string as $p_{\tilde{m}_y,c} \| \delta \| h = \text{DEC}_K(e)$, extracts from such helper data the metadata $p_{\tilde{m}_y,c}$, the hash of the secret string $\delta$ and the hash descriptor $h$, and then computes the estimate secret string $\tilde{s} = \text{ECCdec}(PM(q_x, p_{\tilde{m}_y,c}))$, and the hash of the estimate secret string $\tilde{\delta} = h(\tilde{s})$ and outputs the estimate secret string $\tilde{s}$ if the hash of the estimate secret string $\tilde{\delta}$ and the hash of the secret string $\delta$ extracted from the helper data are the same, or $\emptyset$ otherwise;

constitute an $(\mathcal{K}, \mathcal{Q}, \mathcal{M}, \varepsilon, \mathcal{C}, V, n, k, FAR', FRR')$-uncoupled extractor, with $FRR' \in (FRR - \text{negl}[(k), FRR]$ and $FAR' \in [FAR, FAR + \text{negl}(k))$.

Proof.

The proof of this theorem follows from the definitions of the used constructions. It is proven that the obtained construction provides all the properties mentioned in Definition 15.

1) Regarding the mutual information between the inputs and the outputs of the Gen procedure one has the following:
   (i) Given that the symmetric encryption scheme is perfectly secure, the cyphertext is independent of the plaintext, and therefore it is independent of any variable that generates the plaintext, i.e.

$$Pr\{E = e \mid \tilde{M}_y = \tilde{M}_y\} = Pr\{E = e \mid P_{\tilde{M}_y,C} = ME(\tilde{m}_y, c)\}$$
$$= Pr\{E = e\}.$$

Therefore,
$$H_{|\mathcal{C}_|}(\tilde{M}_y \mid E) = H_{|\mathcal{C}_|}(\tilde{M}_y)$$

which implies $$I_{|\mathcal{C}_|}(E, \tilde{M}_y) = H_{|\mathcal{C}_|}(\tilde{M}_y) - H_{|\mathcal{C}_|}(\tilde{M}_y \mid E) = 0$$

(ii) $I_{|\mathcal{C}_|}(S, \tilde{M}_y) = 0$. This is a consequence of the independence between $\tilde{M}_y$ and the random variable S, which is uniformly sampled from $\mathcal{C}^k$.

(iii) If the encryption key K is given, then it is possible to decrypt the cyphertext, i.e.

$$I_{|\mathcal{C}|}(\tilde{M}_y, (K, E)) = I_{|c|}(\tilde{M}_y, DEC_K(E))$$
$$= I_{|c|}(\tilde{M}_y, P_{\tilde{M}_y,C} \|\Delta\| H)$$
$$= I_{|c|}(\tilde{M}_y, P_{\tilde{M}_y,C})$$

The last equality follows from the independence between the hash random variable $\Delta = h(S)$ and $\tilde{M}_y$. Therefore, $I_{|\mathcal{C}_|}(\tilde{M}_y, (K, E)) \leq H_{|\mathcal{C}_|}(\tilde{M}_y) - n$ follows directly from (6).

2) Regarding the properties of the Rep procedure we have the following:

Taking into account (7) and defining $\tilde{C} = PM(Q_x, DEC_K(e))$ and $c = ECCenc(s)$, one has:

$$Pr\{Rep(K, e, Q_x^V) = \emptyset \mid O_x = O_y\} =$$
$$FRR' = Pr\{h(\tilde{S}) \neq h(s) \mid O_x = O_y\} = 1 - Pr\{h(\tilde{S}) = h(s) \mid O_x = O_y\} =$$
$$1 - Pr\{h(\tilde{S}) = h(s), \tilde{S} = s \mid O_x = O_y\} -$$
$$Pr\{h(\tilde{S}) = h(s), \tilde{S} \neq s \mid O_x = O_y\} =$$
$$1 - Pr\{ECCdec(\tilde{C}) = s \mid O_x = O_y\} - Pr\{h(\tilde{S}) = h(s),$$
$$\tilde{S} \neq s \mid O_x = O_y\} = 1 - Pr\{d_{\mathcal{C}}(\tilde{C}, c) \leq t \mid O_x = O_y\} -$$
$$Pr\{h(\tilde{S}) = h(s), \tilde{S} \neq s \mid O_x = O_y\} =$$
$$1 - Pr\{ver_{ME,PM}(M_y, Q_x^V) = 1 \mid O_x = O_y\} -$$
$$Pr\{h(\tilde{S}) = h(s), \tilde{S} \neq s \mid O_x = O_y\} =$$
$$FRR - Pr\{h(\tilde{S}) = h(s), \tilde{S} \neq s \mid O_x = O_y\}$$

Similarly, one has $$Pr\{Rep(K, e, Q_x^V) = s \mid O_x = O_y\} = \quad (10)$$
$$1 - FRR + Pr\{h(\tilde{S}) = h(s), \tilde{S} \neq s \mid O_x = O_y\}.$$

Therefore:

$$FRR' = FRR - Pr\{h(\tilde{S}) = h(s), \tilde{S} \neq s \mid O_x = O_y\} \quad (11)$$

and taking into account (2):

$$FRR - \text{negl}(k) < FRR' \leq FRR \quad (12)$$

In the case of FAR, one can proceed in the same way, obtaining:

$$FAR \leq FAR' < FAR + \text{negl}(k). \quad (15)$$

3) Finally, regarding the probability of a successful key reproduction when using a different key K', K or a different public string e'≠e, first let us define p'||δ'||h'=$DEC_K$(e') and $\tilde{s}$=ECCdec(PM($q_x$, p')). One must consider that the key s is not known. Therefore, $Pr\{\tilde{S}=s\}=1/|\mathcal{C}|^k$. Furthermore, δ' and h' are independent, which is the case for a perfectly secure encryption scheme.

$$Pr\{Rep(K', e', Q_x^V) = s\} = Pr\{\tilde{S} = s, h'(s) = \delta'\} = \quad (16)$$
$$Pr\{h'(s) = \delta' \mid \tilde{S} = s\} Pr\{\tilde{S} = s\} = \frac{Pr\{h'(s) = \delta' \mid \tilde{S} = s\}}{|\mathcal{C}|^k} < \text{negl}(k)$$

In the practical case where $|\mathcal{C}|$ is prime and the one way hash family $\mathcal{U}$ is built from:
- a 1-to-1 one way function (such as discrete exponentiation $y = f(x) = a^x$, with $x, y \in GF(\mathcal{C}^n)$, where $GF(\mathcal{C}^n)$ is a finite field where the discrete logarithm is hard, and a a generator of $GF(\mathcal{C}^n)$),
- a universal hash permutation $z = p(y) = hy$, with $h \in GF(\mathcal{C}^n) - \{0\}$,
- and a truncate function $g = t(z) = z/|\mathcal{C}^{n-k}|$, where •/• stands for the integer division, $z \in \mathcal{C}^n$ and $g \in \mathcal{C}^k$, then the description of the one way hash function is h and $Pr\{h'(s) = \delta' \mid \tilde{S} = s\} = Pr\{h'(s) = \delta'\} = 1/|\mathcal{C}^{n-k}|$ and $Pr\{Rep(K', e', Q_x^V) = s\} = 1/|\mathcal{C}^n|$.

Figure 12:
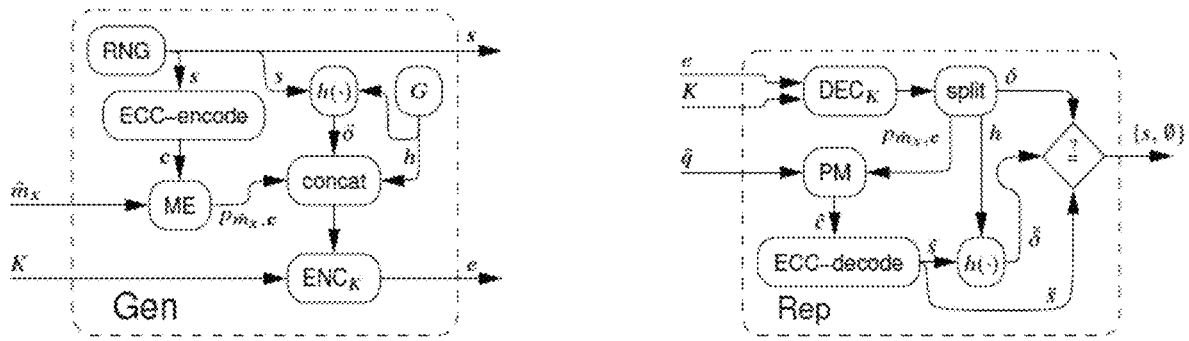
FIG. 12 illustrates more in detail the generation (referred to as "Gen") and reproduction (referred to as "Rep").

The strengthened uncoupled extractor from a model-based uncoupling construction, an error correcting code, an universal one-way hash function and a symmetric encryption scheme, as described in Theorem 1, is depicted in FIG. 12.

FIG. 12 (left) shows the Gen procedure. The inputs to this procedure are the fixed secret K and the estimate of the model of an individual $\tilde{m}_x$. First, a random number generator (the RNG block) is used to generate the secret string s. The G procedure from Definition 6 is used to obtain the hash descriptor h. The target representation is computed as c=ECCenc(s). The metadata $p_{\tilde{m}_y,c}$ is computed as $p_{\tilde{m}_y,c}$=ME($\tilde{m}_y$, c). The hash of the secret string is computed as δ=h(s). The helper data is built by concatenating the metadata, the hash of the secret string, and the hash descriptor, i.e. $p_{\tilde{m}_y,c}||\delta||h$=concat($p_{\tilde{m}_y,c}$,δ,h). This helper data is encrypted to get the public data e=$ENC_K$($p_{\tilde{m}_y,c}||\delta||h$). Finally, both public data and secret string are made available as outputs.

FIG. 12 (right) shows the Rep procedure. Its inputs are the public data e, the fixed secret K and a vector of V samples from a random characterization of an individual $\tilde{q}=[q^1, \ldots, q^V]$. The helper data is obtained by decrypting the public data using the fixed secret as decryption key, i.e. $p_{\tilde{m}_y,c}||\delta||h$=$DEC_K$(e). The metadata $p_{\tilde{m}_y,c}$, the hash of the secret string δ and the hash descriptor h are obtained by splitting the helper data, i.e., $(p_{\tilde{m}_y,c},\delta,h)=\text{split}(p_{\tilde{m}_y,c}\|\delta\|h)$. Then, the estimate target representation is computed as $\tilde{c}=\text{PM}(p_{\tilde{m}_y,c},\tilde{q})$. The estimate secret string $\tilde{s}$ is computed from the estimate target representation $\tilde{c}$ as $\tilde{s}=\text{ECCdec}(\tilde{c})$. The hash of the estimate secret string $\tilde{\delta}$ is computed as $\tilde{\delta}=h(\tilde{s})$ and compared to the hash of the secret string δ. If both hashes coincide, the estimate secret string is returned, otherwise Ø is returned.

The previously presented construction can be understood as an adaptation of the fuzzy extractor aimed at introducing a second authentication factor, i.e. a fixed (non-variable) secret string $K \in \mathcal{K}$. This key can be for instance a knowledge or possession-based authentication factor, and its role in the construction is to protect the metadata $p_{\tilde{m}_y,c}$ that drives the feature mapping of the noisy authentication factor ($Q_y$, modelled by $M_y$) in the model-based uncoupling construction. This metadata discloses some information from the noisy authentication factor, which can be used for linking the noisy authentication factor through different services, and therefore it has to be protected. In the construction shown in Theorem 1 this protection is achieved by using a symmetric encryption scheme, allowing to disclose the public string e without disclosing any information from the noisy authentication factor model $M_y$.

It must be noticed that the disclosure of the metadata $p_{\tilde{m}_y,c}$ would not pose a threat to security, since the target representation c and the metadata $p_{\tilde{m}_y,c}$ are completely unrelated. Most important, the public and secret strings (e and s, respectively) produced by this construction are perfectly uncoupled from both authentication factors involved (the mutual information between them is 0) and therefore it is trivial to produce unlinkable public and secret strings by simply changing the key.

It is not straightforward to obtain practical uncoupled model-based verifiers, since the noisy authentication factors are usually in domains completely unrelated to the practical binary coding spaces, i.e. $\mathcal{C}*=\{0,1\}*$. Below an almost optimal strategy is introduced for building uncoupled model-based constructions and their associated verifiers for a wide family of noisy authentication factors, namely the noisy Gaussian authentication factors.

One widely used feature representation is based on the projection of the original representation into an eigenspace. This kind of representation provides several advantages, including feature dimensionality reduction, denoising and decorrelation of the projected features. This approach has been used in different biometric modalities. In the case of face biometrics, some examples are the eigenface approach, where face images are directly projected into the eigenface space, or approaches where intermediate pyramidal Gabor features are first extracted from the face image and then these pyramidal Gabor features are projected into an eigenspace. In the case of speaker recognition, its use is even more prevalent and approaches such as the eigenvoices, joint factor analysis or i-vectors, which also rely on an eigenspace transformation, are the core methods of the state-of-the-art. A similar approach has been also explored for characterizing online signature templates. These eigenspace techniques are especially useful for characterizing biometric measurements, which are temporal sequences with variable length by nature, as in the case of speech and online signatures, by a fixed length representation. Here, the focus is on the binarization of Gaussian biometrics, where each biometric measurement is represented by a fixed large number of Gaussian features. It must be noted that all the eigenspace based approaches belong to this category.

Eigenspace representations are real-valued features which have to be mapped to a binary representation in order to be protected using template protection schemes such as fuzzy commitment. In the Strengthened uncoupled extractor construction presented in Theorem 1, this parametrization is done by the PM function in the Model-based uncoupling construction. The number F of real-valued features depends on the nature of the feature extraction process and this is usually independent of the number of bits constituting the target binary representation. In this case, the target binary representation are protected using a fuzzy commitment scheme and the common practice is to use the same length for the target binary representation as the length of the employed code, namely n therefore. Each feature could be binarized just by thresholding it with the median of the whole population distribution. However, since the number of biometric features and the number of required binary features are different, a feature selection or combination strategy can be used. Feature selection assumes that each of the biometric features provides enough robustness to be converted into one bit for error correction. Furthermore, when selecting features, some of them are not used, to the detriment of performance. Below, the assumptions on the biometric features are explained first and next the proposed biometric feature combination strategy is presented.

A. Gaussian Features

This invention deals with Gaussian noisy features, which are represented by a vector $q=[q_1, \ldots, q_F]^T$ of F real-valued features, where each feature $q_i$ has a Gaussian distribution among the whole population and the features are independent. This is a natural assumption, taking into account that eigenspace-based features already are uncorrelated and widely used in different biometric representations. Without loss of generality, these features can be considered to have 0 mean and unitary variance. Therefore, the population-wise features' probability density function can be written as:

$$\text{pdf}_q = \Pi_{i=1}^F \text{pdf}_{q^i}(x^i) = \Pi_{i=1}^F \mathcal{N}(x^i;0,1), \tag{17}$$

where $\mathcal{N}(\bullet;\mu,\sigma)$ stands for the normal distribution with mean μ and standard deviation σ.

Before proceding, it is remarked that the formulation does not make use of the Gaussianity of the population-wise distribution of the features. Rather, it is only assumed that different individuals' features are uncorrelated and their distribution has zero mean.

On the other hand, when the features are provided by a given object O in the population (this could be a human user in the case of biometrics), they follow an object-specific distribution. Although this distribution could in general be very complex, as cross-dependencies among the different features may exist, it is assumed here that these features are independent and follow a Gaussian distribution. This is an acceptable assumption when the features are affected by Gaussian noise factors. In that case, the object-specific probability density functions for features can be written as:

$$\text{pdf}_q = \Pi_{i=1}^F \text{pdf}_{q_O^i}(x^i) = \Pi_{i=1}^F \mathcal{N}(x^i;\mu_O^i,\sigma_O^i). \tag{18}$$

B. Parameterized Mapping Through Feature Aggregation

The process is defined that combines F Gaussian features measured from an object O (i.e., $q_O=[q_O^1, \ldots, q_O^F]^T$) into a vector $b_O=[b_O^1, \ldots, b_O^n]^T$ containing n≤F binary features, as a mapping between $q_O$ and $b_O$ through aggregation. In the linear case, this feature aggregation can be parametrized by an object-specific projection matrix $\mathbb{R}^{n \times F}$:

$$b_O = \frac{\text{sign}(P_O q_O) + 1}{2}, \quad (19)$$

where $$\text{sign}(x) = \frac{|x|}{x},$$

$\forall x \neq 0$, 1 otherwise. Note the difference between this sign function and the standard sign function. Since the bits in the binary representation should not be correlated to avoid an unnecessary loss in entropy, one easy solution is to ensure that any real-valued feature is only involved in the computation of one binary feature. Therefore, columns of the projection matrix must contain at most one non-zero element. This sparsity in the matrix allows for encoding the mapping function more efficiently. More generally, this process can be preceded by a orthogonal projection, i.e. $q_O = \Omega q$, $\Omega \in \mathbb{R}^{F \times F}$ is an orthogonal matrix. Note that a matrix $\Omega$ is called orthogonal if $\Omega \Omega^T = \Omega^T \Omega = I_{F \times F}$, where $I_{F \times F}$ is the F×F identity matrix. However, this step is not required for building the parametrized mapping, so it is not included here.

Let $x_O = [x_O^1, \ldots, x_O^F]^T$ be the bit indexes vector for user U, where $x_O^j \in \{1, \ldots, n\}$ is the index of the bit which the realvalued feature $q_O^j$ contributes to. Let $w_O = [w_O^1, \ldots, w_O^F]^T$ be the feature weights vector for user U and define the $\mathcal{J}_O^j = \{k | i_k^U = j\}$ and the aggregated real-valued features vector $g_O = [g_O^1, \ldots, g_O^n]^T$, with $g_O^j = \Sigma_{k \in \mathcal{J}_O^j} w_O^{x_k} q_O^{x_k}$. Then, the parametrized mapping can be rewritten as:

$$b_O = \frac{\text{sign}(g_O) + 1}{2}. \quad (20)$$

In order to derive the multiple features aggregation algorithm, first it is shown how to aggregate two Gaussian features, minimizing the sign change probability of the aggregated feature.

1) On Aggregating Two Gaussian Features:

Consider two independent Gaussian features $f^1$ and $f^2$ with probability density functions $\text{pdf}_{f^1}(x) = \mathcal{N}(x; \mu_{f^1}, \sigma_{f^1})$ and $\text{pdf}_{f^2}(x) = \mathcal{N}(x; \mu_{f^2}, \sigma_{f^2})$, respectively. Without loss of generality, consider that $\mu_{f^1} > 0$ and $\mu_{f^2} > 0$. Let the aggregated Gaussian feature be $g = f^1 + \alpha f^2$, where $\alpha$ is the mixing factor. The mean and standard deviation of g are $\mu_g = \mu_{f^1} + \alpha \mu_{f^2}$ and $\sigma_g = \sqrt{\sigma_{f^1}^2 + \alpha^2 \sigma_{f^2}^2}$, respectively. The probability of a sample $q \sim \mathcal{N}(\mu_g, \sigma_g)$ from this aggregated feature to have a different sign that its mean $\mu_g$ can be defined as a function of the mixing factor as:

$$P_e^g(\alpha) = Pr\{\text{sign}(q \sim \mathcal{N}(\mu_g, \sigma_g)) \neq \text{sign}(\mu_g)\} = \quad (21)$$

$$\frac{1}{\sigma_g \sqrt{2\pi}} \left[ 1 - \text{erf}\left( \frac{\left|\frac{\mu_g}{\sigma_g}\right|}{\sqrt{2}} \right) \right] = \frac{1}{2}\left[ 1 - \text{erf}\left( \frac{\left|\frac{\mu_{f^1} + \alpha \mu_{f^2}}{\sigma_{f^1}^2 + \alpha^2 \sigma_{f^2}^2}\right|}{\sqrt{2}} \right) \right],$$

where |•| denotes absolute value. The optimal weight $\alpha_{opt}$ is defined as that minimizing $P_e^f$. This can be written as:

$$\alpha_{opt} = \text{argmin}_\alpha \{P_e^g(\alpha)\} = \text{maxarg}_\alpha \left\{ \left| \frac{\mu_{f^1} + \alpha \mu_{f^2}}{\sigma_{f^1}^2 + \alpha^2 \sigma_{f^2}^2} \right| \right\} \quad (22)$$

It is straightforward to obtain the closed solution to this optimization problem. The reliability of a Gaussian feature $f^*$ with probability density function $\text{pdf}_{f^*}(x) = \mathcal{N}(x; \mu_{f^*}, \sigma_{f^*})$ is defined as $$\rho_* = \left| \frac{\mu_*}{\sigma_*} \right|.$$

Then the optimal mixing factor can be written as:

$$\alpha_{opt} = \frac{\rho_{f^2} \sigma_{f^1}}{\rho_{f^1} \sigma_{f^2}}. \quad (23)$$

and the squared reliability $\rho_g^2$ of the resulting aggregated feature $g = f^1 + \alpha_{opt} f^2$ can be easily obtained as:

$$\rho_g^2 = \rho_{f^1}^2 + \rho_{f^2}^2. \quad (24)$$

2) Multiple Features Aggregation Algorithm:

Given F independent Gaussian features $f^i$, i=1, ..., F, with probability density function $\text{pdf}_{f^i}(x) = \mathcal{N}(x; \mu_{f^i}, \sigma_{f^i})$, the goal is to aggregate them into n Gaussian features $g^j$, j=1, ..., n, with probability density function $\text{pdf}_{g^j}(x) = \mathcal{N}(x; \mu_{g^j}, \sigma_{g^j})$, such that the mean number of errors is minimum. This mean number of errors is defined as:

$$\epsilon^g = \Sigma_{j=1}^n P_e^{g^j} \quad (25)$$

For each of the aggregated Gaussian features $g^j$, from Eq. 21 one can write the error probability $P_e^g$ as a function of the squared reliability $\rho_{g^j}^2 = \mu_{g^j}^2 / \sigma_{g^j}^2$:

$$P_e^{g^j} = P_e(\rho_{g^j}^2) = \frac{1}{2}\left[ 1 - \text{erf}\left( \sqrt{\frac{\rho_{g^j}^2}{2}} \right) \right]. \quad (26)$$

This minimization is a complex problem, in the family of the multi-way number partitioning. A number of approximate and exact solutions to this problem have been proposed in the literature. In this specific case it can be assumed there exists a proportion of Gaussian features with low user-specific reliability. The greedy heuristic approach provides a solution with a distance to the optimal solution with order equal to the minimum reliability. It is a very simple algorithm with deterministic linear temporal convergence. Algorithm 1 formulates the Metadata Extractor (ME) function for the Model-based Uncoupling Construction using the proposed greedy heuristic approach. Algorithm 2 formulates its corresponding Parameterized Mapping (PM) function for the Model-based Uncoupling Construction.

ALGORITHM 1

Metadata Extractor (ME) algorithm using the Greedy heuristics input: $\begin{cases} M = \{\mu_f, \sigma_f\} \\ c = [c^1, \ldots, c^n] \in \{0, 1\}^n \end{cases}$ output: $p_{M,c} = \{x, w\} = PM(M, c)$ where: $\begin{cases} \mu_f = [\mu_{f^1}, \ldots, \mu_{f^F}]^T \\ \sigma_f = [\sigma_{f^1}, \ldots, \sigma_{f^F}]^T \\ x = [x^1, \ldots, w^F]^T; w^i \in \{1, \ldots, n\} \\ w = [w^1, \ldots, w^F]^T; w^i \in [-1, 1] \end{cases}$ initialize: $\begin{cases} \rho_f^2 = [\rho_{f^1}, \ldots, \rho_{f^1}]^T \leftarrow \left[\left|\frac{\mu_{f^1}}{\sigma_{f^1}}\right|, \ldots, \left|\frac{\mu_{f^F}}{\sigma_{f^F}}\right|^2\right]^T \\ \mu_g^2 = [\mu_{g^1}, \ldots, \mu_{g^n}]^T \leftarrow [0, \ldots, 0]^T \\ \sigma_g^2 = [\sigma_{g^1}, \ldots, \sigma_{g^n}]^T \leftarrow [0, \ldots, 0]^T \\ \rho_g^2 = [\rho_{g^1}, \ldots, \rho_{g^n}]^T \leftarrow [0, \ldots, 0]^T \\ \mathcal{F} \leftarrow \{1, \ldots, F\} \\ x \leftarrow [0, \ldots, 0]^T \end{cases}$ For $i \leftarrow 1$ to $F$ do:
  $i \leftarrow \text{maxarg}_k\{\rho_{f^k} | k \in \mathcal{F}\}$
  $j \leftarrow \text{minarg}_k\{\rho_{g_k}^2 | k \in \mathcal{F}\}$
  $\mathcal{F} \leftarrow \mathcal{F} - \{i\}$
  if $\exists k | x_k = j$ then
    $w_i \leftarrow \frac{\rho_{f^i} \sigma_{g^j}}{\rho_{g^i} \sigma_{f^j}} \text{sign}\left(\frac{\mu_{g^j}}{\mu_{f^i}}\right)$
    $\mu_{g^j} \leftarrow \mu_{g^j} + w^i \mu_{f^i}$
    $\sigma_{g^j} \leftarrow \sqrt{\sigma_{g_j}^2 + (w^i)^2 \sigma_{f_i}^2}$
  else
    $w_i \leftarrow \text{sign}[\mu_{f^i}(2c^j - 1)]$
    $\mu_{g^j} \leftarrow \mu_{f^i}$
    $\sigma_{g^j} \leftarrow \sigma_{f^i}$
  end
  $\rho_{g^j}^2 \leftarrow \rho_{g^j}^2 + \rho_{f^i}^2$
  $X^i \leftarrow j$
end

ALGORITHM 2

Parametrized Mapping (PM) Algorithm associated to the Metadata Extractor (Algorithm 1)

input: $\begin{cases} q = [q^1, \ldots, q^F]^T \\ p = \{x, w\} \end{cases}$ where: $\begin{cases} x = [x^1, \ldots, x^F]^T; x^i \in \{1, \ldots, n\} \\ w = [w^1, \ldots, w^F]^T; w^i \in [-1, 1] \end{cases}$ output: $b = [b^1, \ldots, b^n] \in \{0, 1\}^n$
initialize: $g = [g^1, \ldots, g^n]^T \leftarrow [0, \ldots, 0]^T$
For $i \leftarrow 1$ to $F$ do:
  $g^{x^i} \leftarrow g^{x^i} + w^i q^i$
end
For $i \leftarrow 1$ to $n$ do:
  $b^i \leftarrow \frac{\text{sign} * (g^i) + 1}{2}$
end Now the cryptographic primitives needed to construct the protocol are first introduced. Then the adversary model is defined and next an authentication protocol is shown using the Uncoupled Strengthened Construction previously explained. Finally, a security and privacy analysis is performed in order to show the properties of the protocol regarding security and privacy.

A. Used Cryptographic Primitives

For the proposed protocol use is made of a secure key derivation function (KDF) to derive keys for cryptographic applications using a secret input data, such as a password. A KDF is used to generate keys for an IND-CPA symmetric encryption and a strongly-unforgeable digital signature scheme. Formally, for $\lambda$ being the security parameter:

Definition 16: A key derivation function (KDF) is said to be secure with respect to a source of input with a min-entropy ($H_\infty$) greater than or equal to $\lambda$ if no probabilistic polynomial time (PPT) attacker A can distinguish its output from a random output of equal length, except with a negligible probability $\mu(\lambda)$.

A digital signature scheme is defined by a 3-tuple DS = (KeyGen, SIGN, VER) of functions. The key generation function KeyGen generates the secret string sk using a security parameter as input, i.e., $K \leftarrow \text{KeyGen}(\lambda)$. From the secret string, one derives the public key pk as gen–pk(sk). The signing function SIGN takes as input a message x and the secret string sk and outputs a signature, i.e., $\sigma \leftarrow \text{SIGN}_{sk}(m)$. The verifying function VER takes as input a signature $\sigma$, a message m and a public key pk and outputs whether or not the signature verifies, i.e., $\{\text{true}, \text{false}\} \leftarrow \text{VER}_{pk}(\sigma, m)$.

Definition 17: Let DS=(KeyGen, SIGN, VER) be a digital signature scheme. Consider the following game played between a PPT adversary A and a challenger:

$Exp_{DS,A}(\lambda)$:
    (pk, sk)←KeyGen($\lambda$) $m_0$←
    A($\lambda$, pk)$\sigma_0$←$SIGN_{sk}(m_0)$
    For i=1, . . . , q-1: $m_i$←A($\lambda$, pk, $m_0$, $\sigma_0$, . . . , $m_{i-1}$, $\sigma_{i-1}$)
        $\sigma_i$←$SIGN_{sk}(m_i)$
    (m, $\alpha$)←A($\lambda$, pk, $m_0$, $\sigma_0$, . . . , $m_{q-1}$, $\sigma_{q-1}$)
    Out←$VER_{pk}$(m, $\sigma$)
    Return 1 if Out==true, 0 otherwise and define the adversary's advantage in this game as $$AdvDS_{,A}(\lambda) = Pr\ ExpDS_{,A}(\lambda) = 1$$

Then DS is called strongly unforgeable if $Adv_{DS,A}(\lambda) \leq negl(\lambda)$, for all PPT adversary A.

Note that in the above game m, $m_i$, $\forall i = 0, \ldots, q-1$.

B. Adversarial Model

Two types of adversaries are considered: adversaries that aim to break security and those that aim to break privacy. It is assumed that the adversary is in full control of all communication between Service Providers (SP) and user devices (D) and can, hence, eavesdrop, modify, re-order, replay, inject and drop messages at will. The user and the user's device are assumed to be fully trusted.

The security adversary will try to impersonate an uncompromised user to SP potentially having access, in addition to all protocol transcripts, to all available input of parties involved with the exception of at least one of the authentication factors of the legitimate user it is trying to impersonate. The security adversary also includes malicious service providers that might try to compromise either a legitimate user's password/token or biometric data (binary representation).

Definition 18 (Security). Π=(Enrol, Authenticate) is a secure multi-factor authentication system if no PPT adversary A can successfully authenticate itself to the verifier as the legitimate user it impersonates, even when given all protocol transcripts and all inputs of the verifier and all provers with the exception of at least one authentication factor of the user it tries to impersonate.

The privacy adversary will try to link users across enrolments (possibly at different colluding service providers) for which the linkage of information is only considered that is derived from the user's biometric template Q as this cannot (easily) be changed (as opposed to other knowledge-based and possession-based authentication factors). The adversary provides two biometric templates, $Q_0$ and $Q_1$, from which one will be enrolled as user U, after which the adversary can authenticate poly-many times as this user using any input as the other authentication factor(s). The former assures that the adversary cannot learn anything about the biometric template from the Enrol, while the latter ensures that the adversary does not learn anything from Authenticate either. Privacy is not considered in the sense that multiple authentication attempts by the same user (for the same enrolment) might be linked.

Definition 19 (Privacy). For Π=(Enrol, Authenticate) as before, consider the following game played between a PPT adversary A and a challenger:

$Exp_{\Pi,A}^{Priv}(\lambda)$:
    $(Q_0, Q_1)$←A($\lambda$)
    $b \leftarrow^R \{0,1\}$
    $\alpha$←Enrol(U, $Q_b$, auth_factor*), with $\alpha$ the storage at the verifier and * meaning 1 or more
    For i=1, . . . , poly($\lambda$):
        $\beta_i$←Authenticate(U, $Q_b$, auth_factor*), with $\beta_i$ the protocol transcript i
    b'←A ($\lambda$, $Q_0$, $Q_1$, $\alpha$, $(\beta_i)_{i=1}^{poly(\lambda)}$)
    Return 1 if b==b'; return 0 otherwise The adversary's advantage in this game is defined as $$Adv_{\Pi,A}^{Priv}(\lambda) = |Pr\{Exp_{\Pi,A}^{Priv}(\lambda) = 1\} - \frac{1}{2}|$$

Then Π is called privacy-preserving if $Adv_{\Pi,A}^{Priv}(\lambda) \leq negl(\lambda)$ for all PPT adversary A.

C. Protocol

Now the proposed two-factor secure and privacy preserving user authentication system is presented, comprising an enrolment and an authentication protocol.

The first authentication factor used within the proposed protocol is biometric data, which is used for building a model, which will be the first input to the Strengthened Uncoupled Construction Gen procedure during the enrolment. The second authentication factor is in this case a password, which is used to derive the fixed authentication data, constituting the second input to the Strengthened Uncoupled Construction Gen procedure during the enrolment. The secret string output by the Gen procedure is used to generate a public-private key pair and the public key is stored for signature verification during the authentication.

During the authentication, the user needs to provide fresh helper data and the same password. As during the enrolment, the fixed authentication data is derived from the password. Both fresh biometric data and fixed authentication data are fed to the Strengthened Uncoupled Construction, which outputs the secret string. This secret string is used to generate the private key for signing a challenge from the verifier. Intuitively, the authentication system is secure because in order to impersonate a legitimate user, an attacker needs to correctly sign the challenge and the probability of succeeding without the knowledge of both the user's authentication factors is negligible.

Authentication takes place between a user through his or her device and a service provider. The device mainly acts as a proxy for the user, being able to do the necessary computations and setting up communication with the service provider. The protocols are designed such that no storage is required on the device. This has two major benefits: (i) users can use any trusted device to authenticate to the service provider and (ii) losing the device does not lead to security or privacy issues as there is no secret information stored. It is generally acknowledged that users tend to choose passwords with low min-entropy (i.e. worst case entropy). This has an impact on the maximal achievable security and privacy, where security can be maintained at the same level as long as the adversary has no access to the biometric data of the user, the privacy-preserving properties of the system go down to the min-entropy of the password. Another reason for opting for a possession-based second factor instead of the knowledge based one is user convenience, as the user is not required to type in his or her password every time he or she wants to authenticate. For this reason, both options are left open to which second authentication factor to use in the enrolment and authentication protocol, which will now be described in detail.

Figure 13:
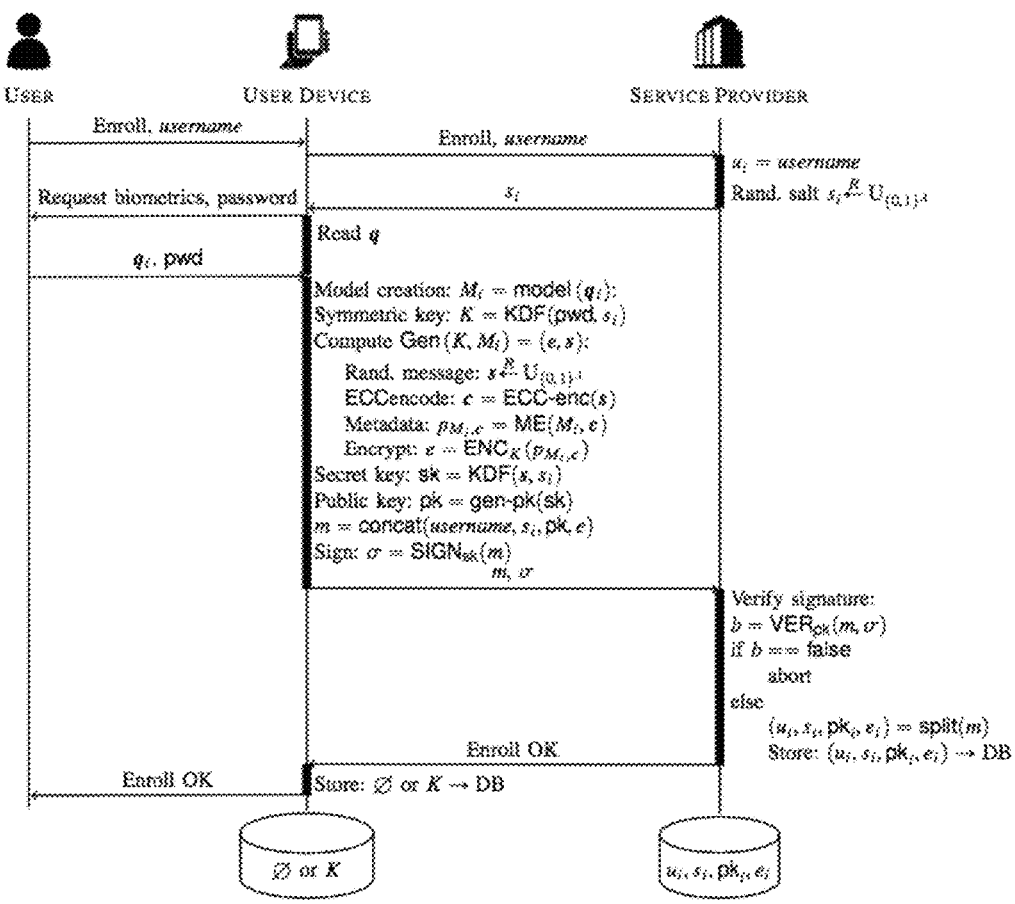
FIG. 13 illustrates an embodiment of the enrolment protocol.

1) Enrolment Protocol:

The enrolment protocol is illustrated in FIG. 13 and involves the following interactions:

The user is asked by the device to provide a (unique) username for the service provider and in a second phase a set of biometric samples $q_i$ together with fixed authentication data. In case that this fixed authentication data is from a possession-based fixed authentication factor, this could be generated by the device itself.

The service provider supplies the device with a unique salt $s_i$ (i.e. a random challenge) for the given username. This salt will be used for deriving both the symmetric key K (when having a knowledge based second authentication factor) and the signing key s. This salt ensures that for both these keys, there is sufficient randomness as input for the key derivation function. It also ensures that if the database of the server gets compromised, one cannot efficiently precompute the symmetric keys derived from the most frequently used passwords.

The device generates a random message that serves as input to the KDF for the generating the signing key sk, from which also a public verification key pk is derived. To ensure that one can later-on recover this message from the randomized binary representation, it is first encoded with an error correcting code.

The binarization metadata is generated and protected by a symmetric key encryption to ensure the privacy of the user.

The device sends the public key and the encrypted binarization metadata back to the service provider, together with a signature over these data and the username. With this signature, the device proves knowledge of the secret string corresponding to the public key. The signature also effectively ties the entire protocol transcript together, ensuring matching conversations between device and service provider. The salt being a unique identifier, it is also used as session identifier for the service provider to link the messages.

2) Authentication Protocol

Figure 14:
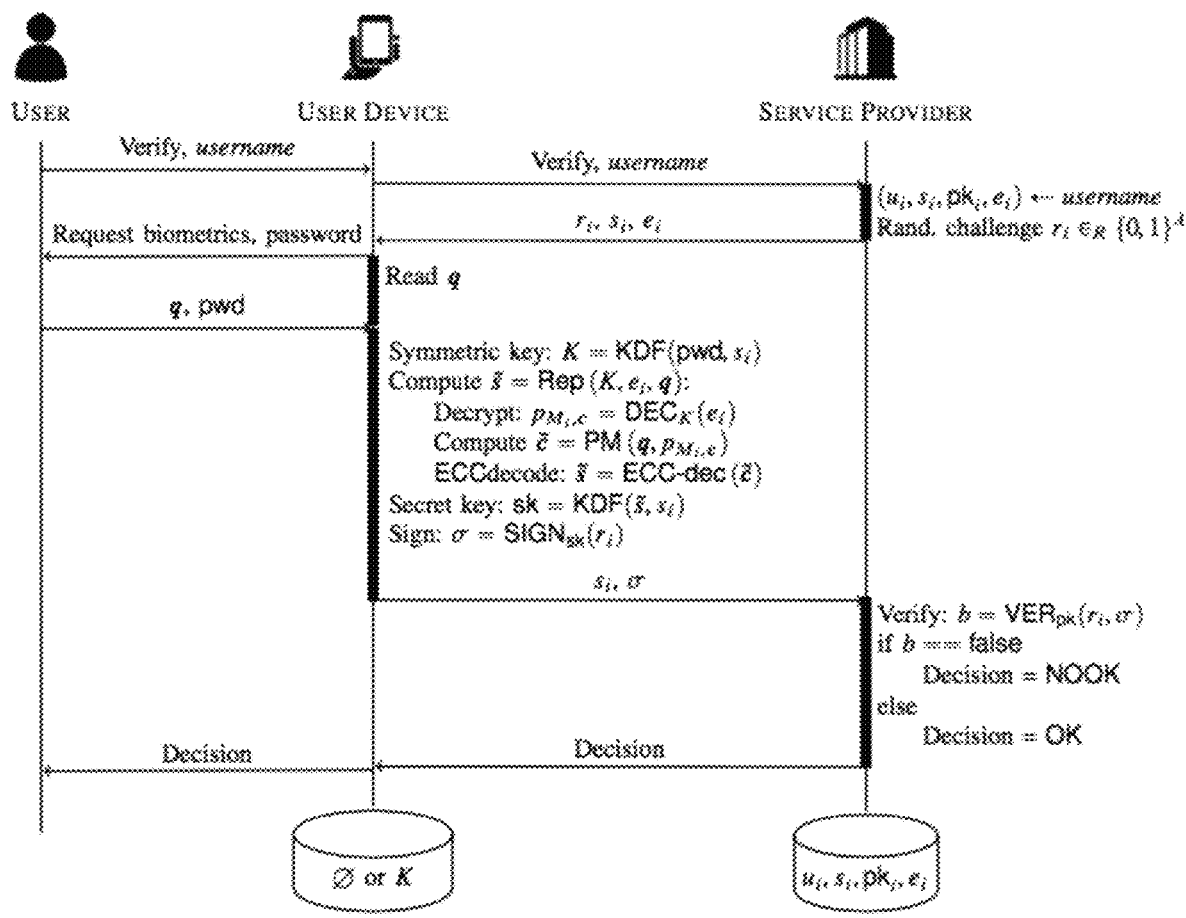
FIG. 14 illustrates an embodiment of the authentication protocol.

The verification protocol is illustrated in FIG. 14 and involves the following interactions:

The user is asked by the device to provide his/her username for the service provider and in a second phase a fresh biometric sample together with fixed authentication data. In case that this fixed authentication data is from a possession-based fixed authentication factor, the user is only asked for a biometric sample.

The service provider supplies the device with the salt, encrypted binarization metadata for the given username. Additionally the service provider also supplies a challenge to the device to ensure the freshness of the authentication protocol.

The device reconstructs the message that was chosen at random during the enrolment protocol from the received inputs. Thanks to the error correcting code, one can decode errors due to the biometric sample being slightly different from the ones supplied during the enrolment protocol. From the decoded message the signing key is derived as in the enrolment protocol.

The device signs the service provider's challenge and sends the signature back to the service provider. Again the salt is used as a session identifier.

If the signature verifies with the stored public key, the user is authenticated.

Now the security and the privacy properties of the protocol are analysed. The protocol is shown to be secure and privacy-preserving against a malicious, as opposed to honest-but-curious, adversary.

Specifically for the case where we use a knowledge-based second authentication factor, provided that the password has a min-entropy at least l, the password-derived symmetric encryption key is indistinguishable from a random key of equal length, except with a negligible probability negl(l). Similarly, the digital signature key is indistinguishable from a random key of equal length, except with a negligible probability negl($\lambda$), since m is chosen at random from $\{0, 1\}^\lambda$.

Security:

Theorem 2 (Security). The proposed user authentication scheme is secure according to Definition 18, under the assumptions that the KDF is secure (cf. Definition 16), the symmetric encryption is IND-CPA-secure (cf. Definition 17) and the digital signature scheme is unforgeable (cf. Definition 17).

Proof: the proof is split into two cases. In the first case, it is assumed that the adversary A is given a valid password, say, $pwd_i$ of user $U_i$. In the second case, A is assumed to be given a valid biometrics, say, a biometric feature vector $Q^v$ of user $U_i$. In both cases, it is also assumed that A has access to the service provider's database, which contains ($u_i$, $s_i$, $pk_i$, $EBM_i$) of all enrolled users. The attacker's goal is to succeed in impersonating a user. This happens if the attacker can produce a signature on SP's challenge, which will pass the verification check using the target user's public key. Therefore, it is assumed for the sake of simplicity that A is presented with a challenge e and that A succeeds in its attack if it can produce a signature $\sigma$ such that true $\leftarrow VER_{pki}$ (e, $\sigma$), where $pk_i$ is the public key of the user that A is impersonating.

Case 1: Assume that the attacker can successfully impersonate a user with a non-negligible probability (e.g., with a probability >negl($\lambda$)). This means that A can produce a signature $\sigma$ for the challenge e such that true $\leftarrow VER_{pki}$ (e, $\sigma$) with a non-negligible probability. This further means that A can guess the signing key $sk_i$ with a non-negligible probability. Recall $sk_i \leftarrow KDF(m, s_i)$, where m is a randomly chosen bit string of length $\lambda$ and $s_i$ is a salt. The message m can be recovered using the binarization metadata $BM_i$ and a valid biometric data $Q^v$ by means of the function g and the error correction code. Using the given password $pwd_i$, A can decrypt $EBM_i$ to obtain the binarization metadata $BM_i$. However, m cannot be recovered by just using $BM_i$; the attacker also needs $Q^v$. Without a valid $Q^v$, it is not possible to obtain m from $ECC_{decode}(g(BM_i, \cdot))$. Therefore, being able to guess $sk_i$ with a non-negligible probability means that the KDF output can be distinguished from a random key, which according to Definition 16 is not possible. Consequently, it must then be the case that A can win the security game against the employed signature scheme, which again contradicts the assumption that the signature scheme is secure (cf. Definition 17). Therefore, in this case, the protocol is secure, except with negl($\lambda$).

Case 2: Assume again that the attacker can successfully impersonate a user with a non-negligible probability. As in Case 1, this means that A can guess the signing key $sk_i$ with a non-negligible probability. In this case, A is given $Q^v$, so this time A needs $BM_i$ to recover m in order to be able to recover $sk_i$. However, the attacker has the encrypted binarization metadata $EBM_i$. To be able to decrypt it to obtain the correct $BM_i$, A needs the correct password with which to recover the symmetric encryption key $K \leftarrow KDF(pwd_i, s_i)$. By a similar reasoning as in Case 1, the attacker can either distinguish the KDF output from a random output or simply forge a signature. Both contradicts the security assumptions on the KDF and the signature scheme. Therefore, in this case, as long as the password has an l' bit entropy, the protocol is secure, except with negl(l').

Note that the use of salt prevents the adversary from building a table of keys for common passwords. The adversary can in principle do that for each salt at the price of a significant increase in memory. Hence, the important security parameter in this second case is the entropy of the password.

Privacy:

Theorem 3: The proposed user authentication scheme is privacy-preserving according to Definition 19, under the assumptions that the KDF is secure (cf. Definition 16), the symmetric encryption is IND-CPA-secure (cf. Definition 17).

This theorem will be shown specifically for the knowledge based second authentication factor, with the security parameter for the password, i.e., the min-entropy of the password. If one is to use a token based approach, where this token is generated in the security parameter X the adversary has only negligible probability in that security parameter.

Proof. The proof is based on a series of hybrid games.

Game$_0$: This is the original privacy game $\text{Exp}_{\Pi,A}^{Priv}(\lambda)$. Let $X_0$ be the event that b'=b in this game.

Game$_1$: This is the same as Game$_0$, except that now the symmetric encryption key generated from KDF(pwd, $s_b$) is replaced by a uniformly distributed random key of equal length. Let $X_1$ be the event that $b^0$=b in this game.

Game$_2$: This is the same as Game$_1$, except that the secret signing key generated from KDF(m, $S_b$) is replaced by a uniformly distributed random key of equal length. Let $X_2$ be the event that $b^0$=b in this game.

Assertion 1: $|\Pr\{X_0\}-\Pr\{X_1\}|$ is negligible.

Proof: This follows from the assumption that the output of the key derivation function KDF is indistinguishable from random, except with a negligible probability. Since otherwise, the adversary can be used as a blackbox to break the security of KDF (i.e., A can be used to distinguish the output of KDF from random).

Assertion 2: $|\Pr\{X_1\}-\Pr\{X_2\}|$ is negligible.

Proof: this also follows from the assumption that the key derivation function is secure.

Assertion 3: $|2\Pr\{X_2\}-1|$ is negligible.

Proof: In Game$_2$, both the symmetric encryption key and the signing key are replaced by uniformly random keys. Therefore, the claim follows from the assumption that the symmetric encryption scheme is IND-CPA secure (in the security parameter $\lambda \gg 1$).

Summing up, as long as the password has e min-entropy, one has that $\text{Adv}^{Priv}_{\Pi,A}(l) \leq \text{negl}(l)$.

Unlinkability and Irreversibility

A common problem with the traditional biometric authentication protocols is that if the biometric template data are stolen or compromised due to, say, hacking, then the users cannot reissue or revoke their biometric templates. This particular drawback of biometrics is often the main reason for criticism. Therefore, it is vital for security, especially in the case of data theft, to allow for renewability and diversity of biometrics, i.e. biometric unlinkability. In this protocol this is achieved by using a separation technique, namely, a random binary representation is employed for each user biometrics and use that in the enrolment and authentication phases. So if the binary representation data c and c are compromised, then the user can representation will be generated. Particularly, when the user re-enrols himself with the same biometrics, a completely new and random binary representation is generated independently from the biometric templates and used to authenticate the user. Since the random binary representation is independent from the biometric features, a compromised binary representation cannot be linked to a user biometrics. Hence, the protocol offers unlinkability.

Regarding irreversibility, the binarization metadata provides some information about the original biometric features in the case that this metadata is designed to increase the reliability of the binary features. However, the information contained in the protected binary representation is hidden and impedes the recovering of the original biometric features. Only having access to both the protected biometric binary representation and to the binarization metadata, an attacker could obtain enough about the original biometric measurements. As the protocol protects both the binarization metadata and the binary biometric representation, no information is disclosed about the original biometric template to the considered adversaries.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An authentication method comprising an enrolment step comprising:
   receiving fuzzy data from a noisy authentication factor, and fixed authentication data,
   generating a secret string independently from said received fuzzy data and said received fixed authentication data,
   deriving metadata from said fuzzy data and said secret string and helper data from said secret string and said metadata,
   encrypting said helper data using said fixed authentication data as encryption key;
   outputting said encrypted helper data as public data,
   and an authentication step comprising:
   receiving said public data output during said enrolment step, further fuzzy data and said fixed authentication data,
   decrypting said received public data using said fixed authentication data as decryption key,
   recovering said helper data from said decrypted public data, reproducing said secret string using said further fuzzy data and recovered metadata obtained via said recovered helper data, validating said reproduced secret string using said recovered helper data, releasing said reproduced secret string if said validating yields a positive outcome.

2. The authentication method according to claim 1, where the entropy of said fuzzy data given said metadata is greater than or equal to the length of said secret string.

3. The authentication method of claim 1, wherein it is at least computationally infeasible to derive from said public data information about said fuzzy data.

4. The authentication method of claim 3, wherein the mutual information between said fuzzy data and said public data is substantially zero.

5. The authentication method of claim 1, wherein said output public data is stored in a personal device.

6. The authentication method of claim 1, wherein said output public data is stored in a server.

7. The authentication method of claim 1, wherein said output public data is stored in a token.

8. The authentication method of claim 1, wherein said fuzzy data is provided by a biometric source.

9. The authentication method of claim 1, wherein said fuzzy data is provided by a physically unclonable function, PUF, source.

10. The authentication method of claim 9, wherein said PUF is provided with a fixed challenge.

11. The authentication method of claim 1, wherein said fuzzy data and/or said further fuzzy data is acquired either simultaneously or consecutively.

12. The authentication method of claim 11, wherein said fuzzy data and/or said further fuzzy data is provided by a combination of biometric sources and/or PUF sources.

13. The authentication method of claim 1, wherein said fixed authentication data is stored in a file or in an authentication token, or is derived from password or a passphrase.

14. The authentication method of claim 13, wherein said fixed authentication data is a combination of a plurality of fixed authentication data, acquired either simultaneously or consecutively.

15. The authentication method of claim 1, where in said enrolment step also said secret string is output.

16. The authentication method of claim 1, wherein said secret string is generated using a random generator.

17. A program, executable on a programmable device containing instructions, which, when executed, perform the method of claim 1.

18. An authentication system comprising:
enrolment means adapted to:
receive fuzzy data from a noisy authentication factor and fixed authentication data,
generate a secret string independently from said received fuzzy data and said received fixed authentication data,
derive metadata from said fuzzy data and said secret string and helper data from said secret string and said metadata,
encrypt said helper data using said fixed authentication data as encryption key,
output said encrypted helper data as the public data,
authentication means adapted to:
receive said public data output, further fuzzy data and said fixed authentication data,
decrypt said received public data using said fixed authentication data as decryption key,
recover said helper data and said metadata from said decrypted public data,
reproduce said secret string using said further fuzzy data and said recovered metadata,
validate said reproduced secret string using said recovered helper data,
release said reproduced secret string if said validating yields a positive outcome.

* * * * *